(12) United States Patent
Iyer et al.

(10) Patent No.: US 10,216,661 B2
(45) Date of Patent: Feb. 26, 2019

(54) HIGH PERFORMANCE INTERCONNECT PHYSICAL LAYER

(71) Applicant: Intel Corporation, Santa Clara, CA (US)

(72) Inventors: Venkatraman Iyer, Round Rock, TX (US); Darren S. Jue, Sunnyvale, CA (US); Rahul Shah, San Francisco, CA (US); Arvind Kumar, Brookline, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/821,401

(22) Filed: Nov. 22, 2017

(65) Prior Publication Data

US 2018/0095927 A1 Apr. 5, 2018

Related U.S. Application Data

(63) Continuation of application No. 15/193,697, filed on Jun. 27, 2016, now Pat. No. 9,892,086, which is a
(Continued)

(51) Int. Cl.
| | |
|---|---|
| *G06F 9/30* | (2018.01) |
| *G06F 13/22* | (2006.01) |
| *G06F 12/0831* | (2016.01) |
| *G06F 13/42* | (2006.01) |
| *G06F 8/71* | (2018.01) |
| *G06F 8/77* | (2018.01) |

(Continued)

(52) U.S. Cl.
CPC .......... *G06F 13/22* (2013.01); *G06F 1/3287* (2013.01); *G06F 8/71* (2013.01); *G06F 8/77* (2013.01); *G06F 9/30145* (2013.01); *G06F 9/44505* (2013.01); *G06F 9/466* (2013.01); *G06F 11/1004* (2013.01); *G06F 12/0806* (2013.01); *G06F 12/0808* (2013.01); *G06F 12/0813* (2013.01); *G06F 12/0815* (2013.01); *G06F 12/0831* (2013.01); *G06F 12/0833* (2013.01); *G06F 13/4022* (2013.01); *G06F 13/4068* (2013.01); *G06F 13/4221* (2013.01); *G06F 13/4282* (2013.01); *G06F 13/4286* (2013.01); *G06F 13/4291* (2013.01); *H04L 9/0662* (2013.01); *H04L 49/15* (2013.01); *G06F 8/73* (2013.01); *G06F 13/4273* (2013.01); *G06F 2212/1016* (2013.01); *G06F 2212/2542* (2013.01); *G06F 2212/622* (2013.01); *H04L 12/4641* (2013.01); *H04L 45/74* (2013.01); *Y02D 10/13* (2018.01); *Y02D 10/14* (2018.01);
(Continued)

(58) Field of Classification Search
None
See application file for complete search history.

(56) References Cited

U.S. PATENT DOCUMENTS

| | | | | |
|---|---|---|---|---|
| 5,987,056 A | * | 11/1999 | Banister | H04B 1/707 375/130 |
| 7,472,318 B2 | * | 12/2008 | Fan | H04L 1/241 370/236.1 |

(Continued)

*Primary Examiner* — Isaac T Tecklu
(74) *Attorney, Agent, or Firm* — Alliance IP, LLC

(57) ABSTRACT

A serial data link is to be adapted during initialization of the link. Adaptation of the link is to include receiving a pseudorandom binary sequence (PRBS) from a remote agent, analyzing the PRBS to identify characteristics of the data link, and generating metric data describing the characteristics.

19 Claims, 15 Drawing Sheets

Related U.S. Application Data continuation of application No. 13/976,971, filed as application No. PCT/US2013/032708 on Mar. 15, 2013, now Pat. No. 9,378,171.

(60) Provisional application No. 61/717,091, filed on Oct. 22, 2012.

(51) Int. Cl.

| | | |
|---|---|---|
| *G06F 12/0806* | (2016.01) | |
| *H04L 12/933* | (2013.01) | |
| *G06F 9/46* | (2006.01) | |
| *G06F 13/40* | (2006.01) | |
| *G06F 12/0813* | (2016.01) | |
| *G06F 12/0815* | (2016.01) | |
| *G06F 9/445* | (2018.01) | |
| *G06F 1/3287* | (2019.01) | |
| *G06F 11/10* | (2006.01) | |
| *H04L 9/06* | (2006.01) | |
| *G06F 12/0808* | (2016.01) | |
| *H04L 12/741* | (2013.01) | |
| *G06F 8/73* | (2018.01) | |
| *H04L 12/46* | (2006.01) | |

(52) U.S. Cl.
CPC ............ *Y02D 10/151* (2018.01); *Y02D 10/40* (2018.01); *Y02D 10/44* (2018.01); *Y02D 30/30* (2018.01)

(56) References Cited

U.S. PATENT DOCUMENTS

| | | | | |
|---|---|---|---|---|
| 9,378,171 | B2* | 6/2016 | Iyer | G06F 13/4286 |
| 2003/0107989 | A1* | 6/2003 | Ray | H04W 24/04 370/229 |
| 2005/0027876 | A1* | 2/2005 | Umei | H04L 12/42 709/231 |
| 2005/0102593 | A1* | 5/2005 | Ko | G01R 31/31716 714/733 |
| 2006/0041696 | A1* | 2/2006 | Cherukuri | G06F 13/4278 710/100 |
| 2006/0090014 | A1* | 4/2006 | Wong | G06F 13/423 710/10 |
| 2007/0239922 | A1* | 10/2007 | Horigan | G06F 13/4286 710/307 |
| 2010/0188097 | A1* | 7/2010 | Sul | G01R 31/31717 324/537 |
| 2012/0079160 | A1* | 3/2012 | Iyer | G06F 13/36 710/311 |
| 2013/0036335 | A1* | 2/2013 | Kim | G09G 3/006 714/704 |
| 2013/0063302 | A1* | 3/2013 | Krasner | G01S 19/11 342/357.29 |
| 2014/0057610 | A1* | 2/2014 | Olincy | H04W 4/16 455/414.1 |
| 2014/0112339 | A1* | 4/2014 | Safranek | G06F 13/4221 370/389 |

\* cited by examiner

DETECT  ┌─805

| EIEOS | TS 0 | TS 1 | TS 2 | TS 3 | . . . . . | TS 6 | ~1KUI |

POLLING/CONFIG/LOOPBACK  ┌─810

| EIEOS | TS 0 | TS 1 | TS 2 | TS 3 | . . . . . | TS 30 | ~4KUI |

PARTIAL WIDTH TRANSMITTING STATE EXIT  ┌─815

| EIEOS | | | | | | | |
| EIEOS | FTS 0 | FTS 1 | FTS 2 | FTS 3 | . . . . . . | FTS 6 | ~1KUI |
| EIEOS | FTS | FTS | . . . . . | SDS | FTSp | |

*FIG. 8*

HIGH PERFORMANCE INTERCONNECT PHYSICAL LAYER

CROSS REFERENCE TO RELATED APPLICATIONS

This application is a continuation (and claims the benefit of priority under 35 U.S.C. § 120) of U.S. patent application Ser. No. 15/193,697 filed Jun. 27, 2016, entitled HIGH PERFORMANCE INTERCONNECT PHYSICAL LAYER, which is a continuation of U.S. patent application Ser. No. 13/976,971, now U.S. Pat. No. 9,378,171, with a U.S. 371 filing date of Jun. 27, 2013 and an effective filing date of Mar. 15, 2013, entitled HIGH PERFORMANCE INTERCONNECT PHYSICAL LAYER, which application is a national stage application under 35 U.S.C. § 371 of PCT International Application Serial No. PCT/US2013/032708, filed on Mar. 15, 2013, which application claims the benefit of priority to U.S. Provisional Patent Application Ser. No. 61/717,091 filed on Oct. 22, 2012. The disclosures of the prior applications are considered part of and are hereby incorporated by reference in their entirety in the disclosure of this application.

FIELD

The present disclosure relates in general to the field of computer development, and more specifically, to software development involving coordination of mutually-dependent constrained systems.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 8 illustrates example control supersequences.

Like reference numbers and designations in the various drawings indicate like elements.

DETAILED DESCRIPTION

Figure 1:
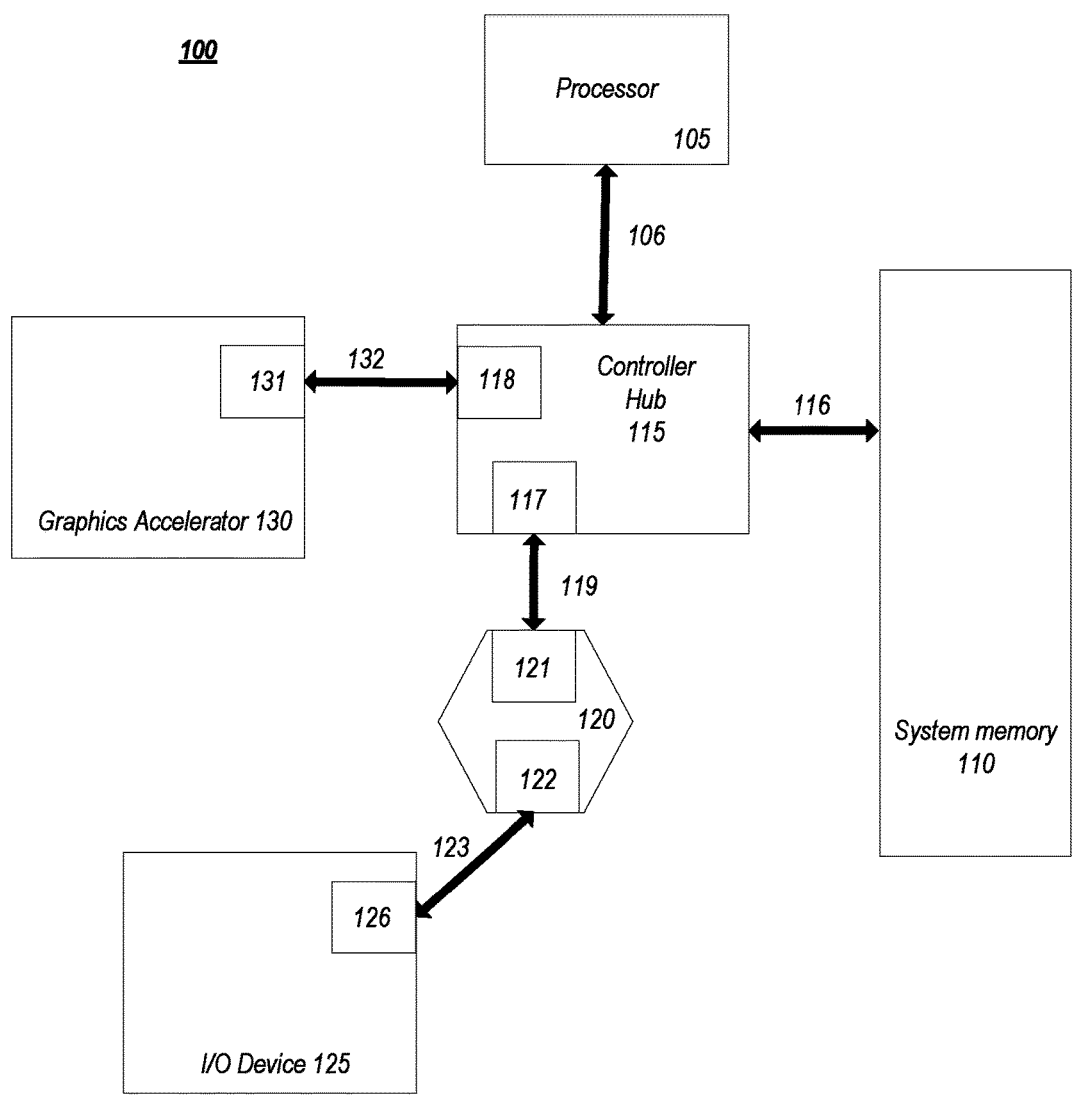
FIG. 1 illustrates a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein.

The Peripheral Component Interconnect (PCI) Express (PCIe) interconnect fabric architecture and QuickPath Interconnect (QPI) fabric architecture, among other examples, can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. Although the primary discussion herein is in reference to a new high-performance interconnect (HPI) architecture, aspects of the invention described herein may be applied to other interconnect architectures, such as a PCIe-compliant architecture, a QPI-compliant architecture, a MIPI compliant architecture, a high-performance architecture, or other known interconnect architecture.

Referring to FIG. 1, an embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
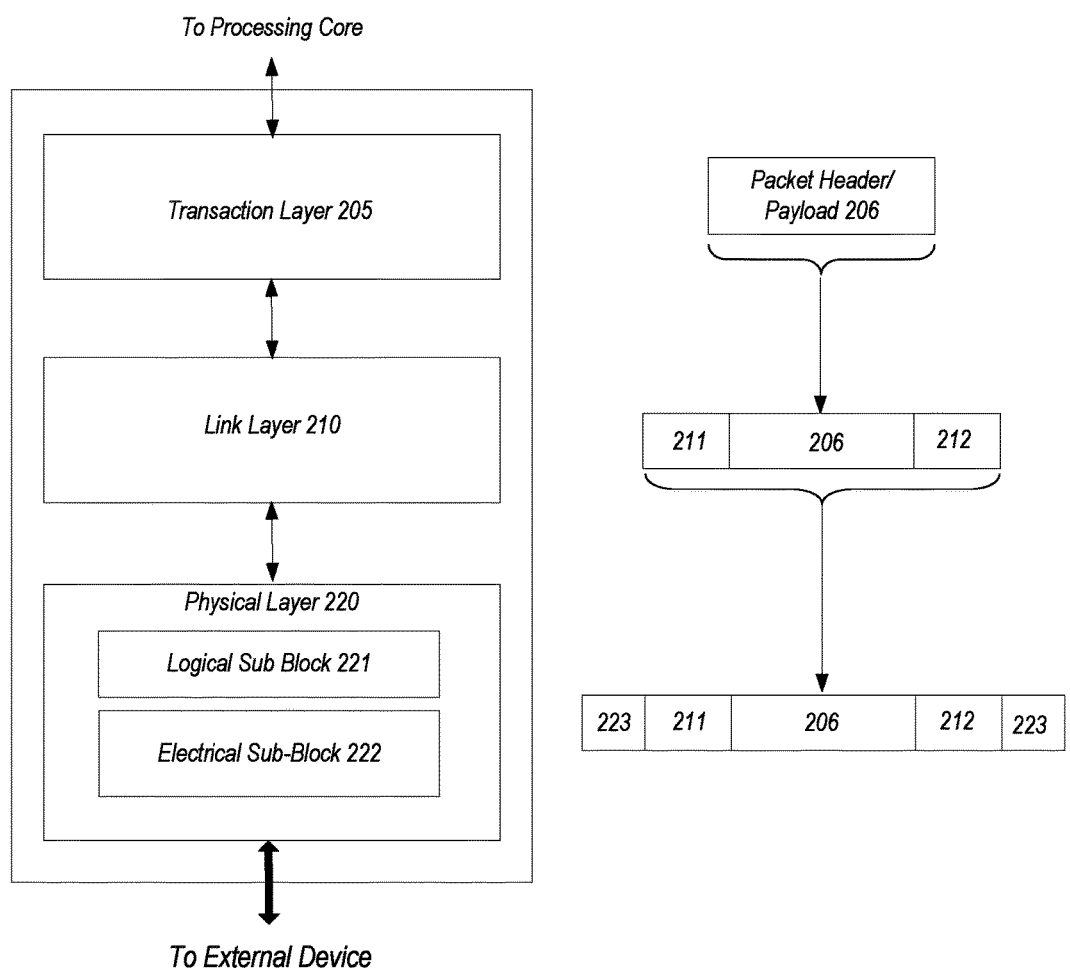
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Figure 3:
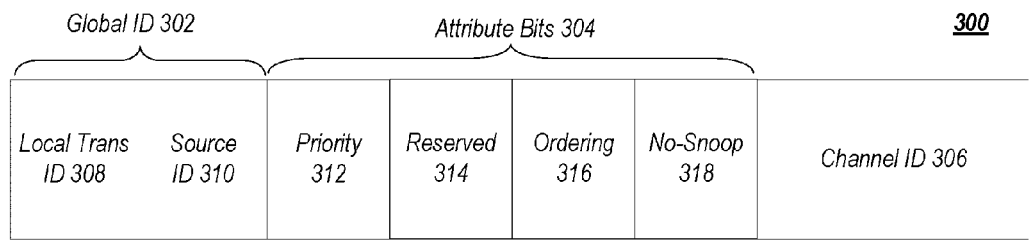
FIG. 3 illustrates an embodiment of a transaction descriptor.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 4:
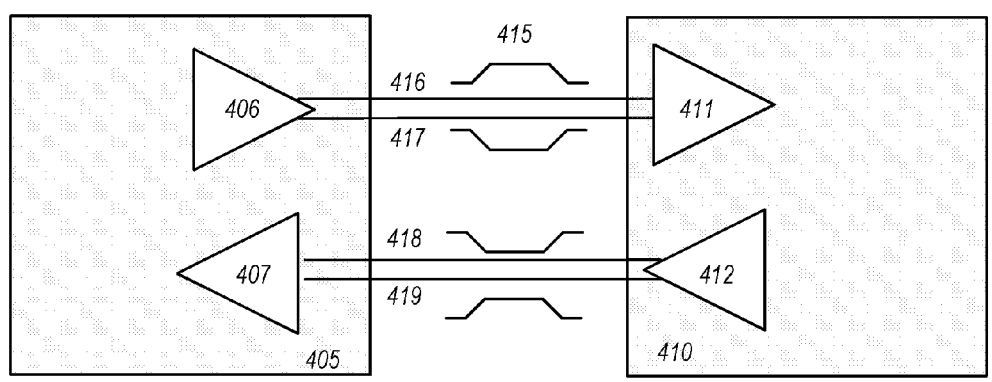
FIG. 4 illustrates an embodiment of a serial point-to-point link.

Referring next to FIG. 4, an example embodiment of a serial point to point fabric is illustrated. A serial point-to-point link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

In one embodiment, a new High Performance Interconnect (HPI) is provided. HPI can include a next-generation cache-coherent, link-based interconnect. As one example, HPI may be utilized in high performance computing platforms, such as workstations or servers, including in systems where PCIe or another interconnect protocol is typically used to connect processors, accelerators, I/O devices, and the like. However, HPI is not so limited. Instead, HPI may be utilized in any of the systems or platforms described herein. Furthermore, the individual ideas developed may be applied to other interconnects and platforms, such as PCIe, MIPI, QPI, etc.

To support multiple devices, in one example implementation, HPI can include an Instruction Set Architecture (ISA) agnostic (i.e. HPI is able to be implemented in multiple different devices). In another scenario, HPI may also be utilized to connect high performance I/O devices, not just processors or accelerators. For example, a high performance PCIe device may be coupled to HPI through an appropriate translation bridge (i.e. HPI to PCIe). Moreover, the HPI links may be utilized by many HPI based devices, such as processors, in various ways (e.g. stars, rings, meshes, etc.).

Figure 5:
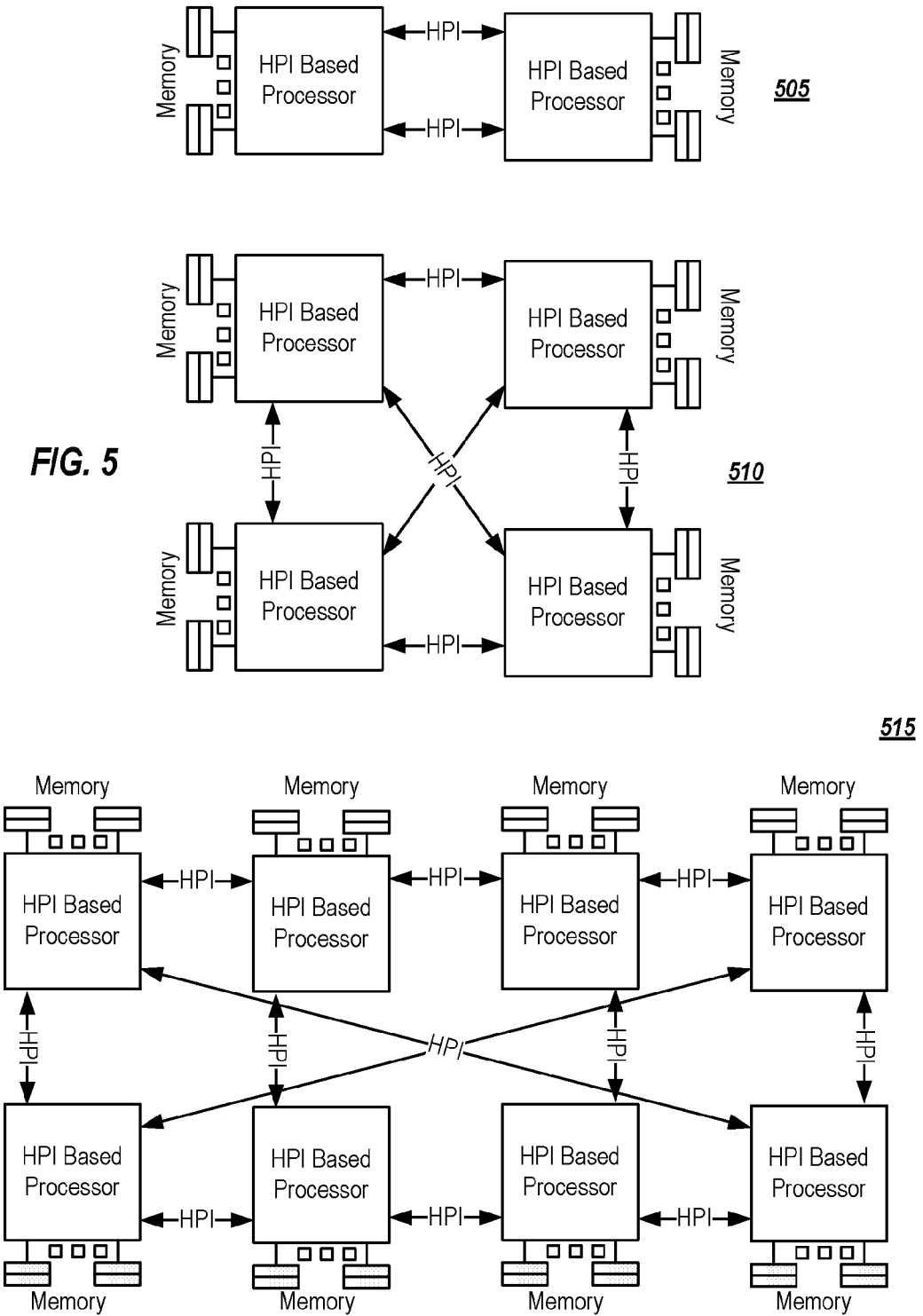
FIG. 5 illustrates embodiments of potential High Performance Interconnect (HPI) system configurations.

FIG. 5 illustrates example implementations of multiple potential multi-socket configurations. A two-socket configuration 505, as depicted, can include two HPI links; however, in other implementations, one HPI link may be utilized. For larger topologies, any configuration may be utilized as long as an identifier (ID) is assignable and there is some form of virtual path, among other additional or substitute features. As shown, in one example, a four socket configuration 510 has an HPI link from each processor to another. But in the eight socket implementation shown in configuration 515, not every socket is directly connected to each other through an HPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The HPI architecture includes a definition of a layered protocol architecture, including in some examples, protocol layers (coherent, non-coherent, and, optionally, other memory based protocols), a routing layer, a link layer, and a physical layer. Furthermore, HPI can further include enhancements related to power managers (such as power control units (PCUs)), design for test and debug (DFT), fault handling, registers, security, among other examples. FIG. 5 illustrates an embodiment of an example HPI layered protocol stack. In some implementations, at least some of the layers illustrated in FIG. 5 may be optional. Each layer deals with its own level of granularity or quantum of information (the protocol layer 605a,b with packets 630, link layer 610a,b with flits 635, and physical layer 605a,b with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example, HPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610a,b may support multiple messages, such as a request, snoop, response, writeback, non-coherent data, among other examples.

Figure 6:
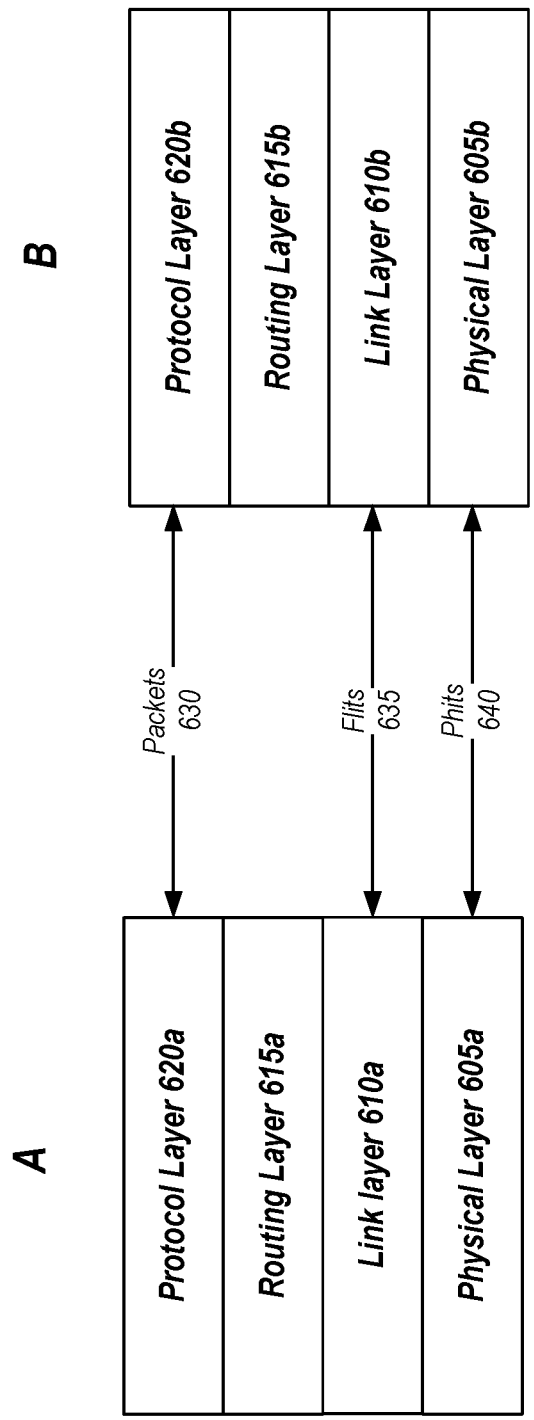
FIG. 6 illustrates an embodiment of a layered protocol stack associated with HPI.

The Physical layer 605a,b (or PHY) of HPI can be implemented above the electrical layer (i.e. electrical conductors connecting two components) and below the link layer 610a,b, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610a,b can be implemented so as to provide reliable data transfer between two protocol or routing entities. The Link layer can abstract Physical layer 605a,b from the Protocol layer 620a,b, and can be responsible for the flow control between two protocol agents (A, B), and provide virtual channel services to the Protocol layer (Message Classes) and Routing layer (Virtual Networks). The interface between the Protocol layer 620a,b and the Link Layer 610a,b can typically be at the packet level. In one embodiment, the smallest transfer unit at the Link Layer is referred to as a flit which a specified number of bits, such as 192 bits or some other denomination. The Link Layer 610a,b relies on the Physical layer 605a,b to frame the Physical layer's 605a,b unit of transfer (phit) into the Link Layer's 610a,b unit of transfer (flit). In addition, the Link Layer 610a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615a,b can provide a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a HPI packet into the HPI fabric. The lookup at an intermediate router may be used to route an HPI packet from an input port to an output port. The lookup at a destination port may be used to target the destination HPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615a,b relies on the Link layer 610a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In some implementations, HPI can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

A link can be established between two agents on either side of an interconnect. An agent sending data can be a local agent and the agent receiving the data can be a remote agent. State machines can be employed by both agents to manage various aspects of the link. In one embodiment, the Physical layer datapath can transmit flits from the link layer to the electrical front-end. The control path, in one implementation, includes a state machine (also referred to as a link training state machine or the similar). The state machine's actions and exits from states may depend on internal signals, timers, external signals or other information. In fact, some of the states, such as a few initialization states, may have timers to provide a timeout value to exit a state. Note that detect, in some embodiments, refers to detecting an event on both legs of a lane; but not necessarily simultaneously. However, in other embodiments, detect refers to detection of an event by an agent of reference. Debounce, as one example, refers to sustained assertion of a signal. In one embodiment, HPI supports operation in the event of non-function lanes. Here, lanes may be dropped at specific states.

States defined in the state machine can include reset states, initialization states, and operational states, among other categories and subcategories. In one example, some initialization states can have a secondary timer which is used to exit the state on a timeout (essentially an abort due to failure to make progress in the state). An abort may include updating of registers, such as status register. Some states can also have primary timer(s) which are used to time the primary functions in the state. Other states can be defined such that internal or external signals (such as handshake protocols) drive transition from the state to another state, among other examples.

A state machine may also support debug through single step, freeze on initialization abort and use of testers. Here, state exits can be postponed/held until the debug software is ready. In some instance, the exit can be postponed/held until the secondary timeout. Actions and exits, in one embodiment, can be based on exchange of training sequences. In one embodiment, the link state machine is to run in the local agent clock domain and transition from one state to the next is to coincide with a transmitter training sequence boundary. Status registers may be utilized to reflect the current state.

Figure 7:
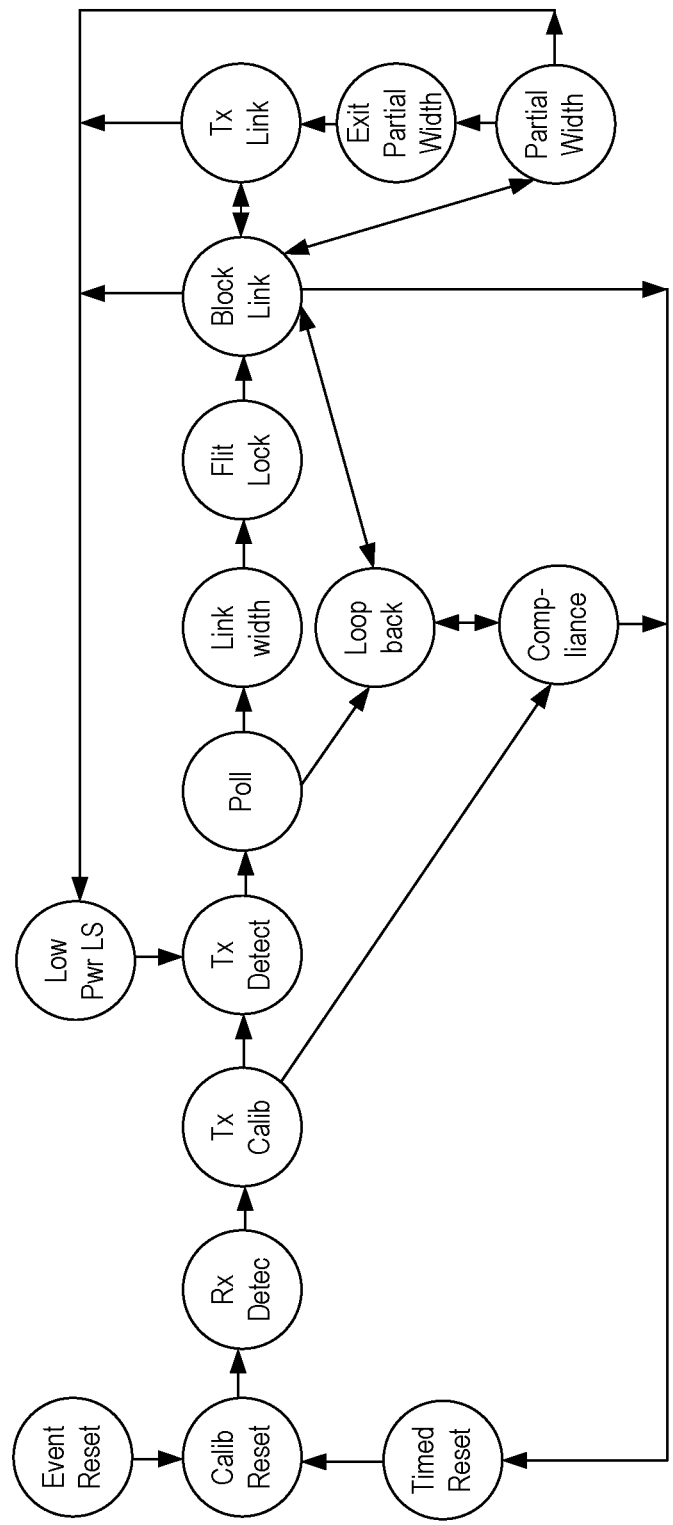
FIG. 7 illustrates a representation of an example state machine.

FIG. 7 illustrates a representation of at least a portion of a state machine used by agents in one example implementation of HPI. It should be appreciated that the states included in the state table of FIG. 7 include a non-exhaustive listing of possible states. For instance, some transitions are omitted to simplify the diagram. Also, some states may be combined, split, or omitted, while others might be added. Such states can include:

Event reset state: entered on a warm or cold reset event. Restores default values. Initialize counters (e.g., sync counters). May exit to another state, such as another reset state.

Timed reset state: timed state for in-band reset. May drive a predefined electrical ordered set (EOS) so remote receivers are capable of detecting the EOS and entering the timed reset as well. Receiver has lanes holding electrical settings. May exit to an agent to calibrate reset state.

Calibrate reset state: calibration without signaling on the lane (e.g. receiver calibration state) or turning drivers off. May be a predetermined amount of time in the state based on a timer. May set an operational speed. May act as a wait state when a port is not enabled. May include minimum residency time. Receiver conditioning or staggering off may occur based on design. May exit to a receiver detect state after a timeout and/or completion of calibration.

Receiver detect state: detect presence of a receiver on lane(s). May look for receiver termination (e.g. receiver pulldown insertion). May exit to calibrate reset state upon a specified value being set or when another specified value is not set. May exit to transmitter calibrate state if a receiver is detected or a timeout is reached.

Transmitter calibrate state: for transmitter calibrations. May be a timed state allocated for transmitter calibrations. May include signaling on a lane. May continuously drive an EOS, such as an EIEOS. May exit to compliance state when done calibrating or on expiration of a timer. May exit to transmitter detect state if a counter has expired or a secondary timeout has occurred.

Transmitter detect state: qualifies valid signaling. May be a handshake state where an agent completes actions and exits to a next state based on remote agent signaling. Receiver may qualify valid signaling from transmitter. Receiver, in one embodiment, looks for a wake detect, and if debounced on one or more lanes looks for it on the other lanes. Transmitter drives a detect signal. May exit to a polling state in response to debounce being completed for all lanes and/or a timeout or if debounce on all lanes is not complete and there is a timeout. Here, one or more monitor lanes may be kept awake to debounce a wake signal. And if debounced then the other lanes are potentially debounced. This can enable power savings in low power states.

Polling state: receiver adapts, initializes drift buffer and locks on bits/bytes (e.g. identifies symbol boundaries). Lanes may be deskewed. A remote agent may cause an exit to a next state (e.g. a Link Width State) in response to an acknowledge message. Polling can additionally include a training sequence lock by locking to an EOS and a training sequence header. Lane to lane skew at remote transmitter may be capped at a first length for top speed and a second length for slow speed. Deskew may be performed in a slow mode as well as an operational mode. Receiver may have a specific maximum to deskew lane-to-lane skew, such as 8, 16, or 32 intervals of skew. Receiver actions may include latency fixing. Receiver actions, in one embodiment, can be completed on successful deskew of a valid lane map. A successful handshake can be achieved, in one example, when a number of consecutive training sequence headers are received with acknowledgements and a number of training sequences with an acknowledge are transmitted after the receiver has completed its actions.

Link width state: agent communicates with the final lane map to remote transmitter. Receiver receives the information and decodes. Receiver may record a configured lane map in a structure after checkpoint of a previous lane map value in a second structure. Receiver may also respond with an acknowledge ("ACK"). May initiate an in-band reset. As one example, first state to initiate in-band reset. In one embodiment, exit to a next state, such as flit configuration state, is performed in response to the ACK. Further, prior to entering low power state, a reset signal may also be generated if the frequency of a wake detect signal occurrence drops below a specified value (e.g. 1 every number of unit intervals (UIs), such as 4K UI). Receiver may hold current and previous lane maps. Transmitter may use different groups of lanes based on training sequences having different values. Lane map may not modify some status registers in some embodiments.

Flitlock configuration state: entered by a transmitter but the state is considered exited (i.e. secondary timeout moot) when both transmitter and receiver have exited to a blocking link state or other link state. Transmitter exit to a link state, in one embodiment, includes start of a data sequence (SDS) and training sequence (TS) boundary after receiving a planetary alignment signal. Here, receiver exit may be based on receiving an SDS from a remote transmitter. This state may be a bridge from agent to link state. Receiver identifies SDS. Receiver may exit to blocking link state (BLS) (or a control window) if SDS received after a descrambler is initialized. If a timeout occurs, exit may be to reset state. Transmitter drives lanes with a configuration signal. Transmitter exit may be to reset, BLS, or other states based on conditions or timeouts.

Transmitting Link State: a link state. Flits are sent to a remote agent. May be entered from a blocking link state and return to a blocking link state on an event, such as a timeout. Transmitter transmits flits. Receiver receives flits. May also exit to a low power link state. In some implementations, transmitting link state (TLS) can be referred to as the L0 state.

Blocking Link State: a link state. Transmitter and receiver are operating in a unified manner. May be a timed state during which the link layer flits are held off while the Physical layer information is communicated to the remote agent. May exit to a low power link state (or other link state based on the design). A blocking link state (BLS), in one embodiment, periodically occurs. The period is referred to as a BLS interval and may be timed, as well as may differ between slow speed and operational speed. Note that the link layer may be periodically blocked from sending flits so that a Physical layer control sequence of a length may be sent, such as during a transmitting link state or a partial width transmitting link state. In some implementations, blocking link state (BLS) can be referred to as a L0 control, or L0c, state.

Figure 9:
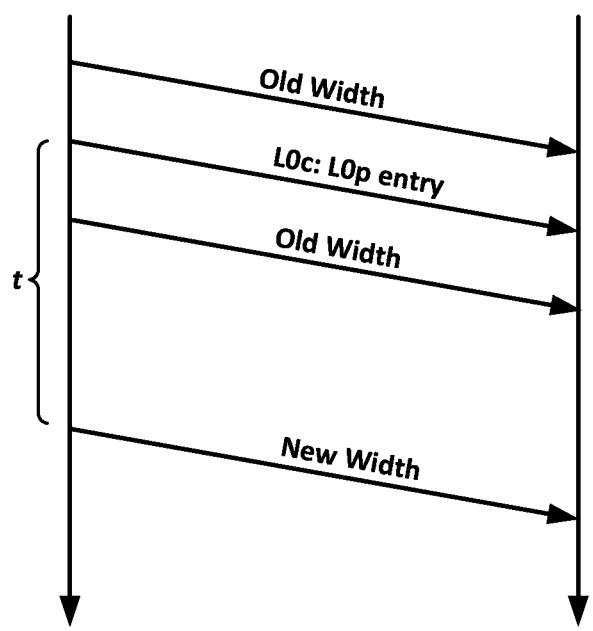
FIG. 9 illustrates a flow diagram of an example transition to a partial width state.

Partial Width Transmitting Link State: Link state. May save power by entering a partial width state. In one embodiment asymmetric partial width refers to each direction of a two direction link having different widths, which may be supported in some designs. In one example, a partial width transmitting link state is shown in the example of FIG. 9. Here, a partial width indication is sent while transmitting on a link with a first width to transition the link to transmit at a second, new width. A mismatch may result in a reset. Note that speeds may not be altered but width may be. Therefore, flits are potentially sent at different widths. May be similar to a transmitting link state logically; yet, since there is a smaller width, it may take longer to transmit flits. May exit to other link states, such as a low power link state based on certain received and sent messages or an exit of the partial width transmitting link state or a link blocking state based on other events. In one embodiment, a transmitter port may turn idle lanes off in a staggered manner to provide better signal integrity (i.e. noise mitigation). Here, non-retry-able flits, Such as Null flits, may be utilized during periods where the link width is changing. A corresponding receiver may drop these null flits and turn idle lanes off in a staggered manner, as well as record the current and previous lane maps in one or more structures. Note status and associated status register may remain unaltered.

In some implementations, partial width transmitting link state can be referred to as a partial L0, or L0p, state.

Exit Partial Width Transmitting Link State: exit the partial width state. May or may not use a blocking link state in some implementations. The transmitter initiates exit, in one embodiment, by sending partial width exit patterns on the idle lanes to train and deskew them. As one example, an exit pattern start with EIEOS, which is detected and debounced to signal that the lane is ready to start the entry to a full transmitting link state, and may end with SDS or Fast Training Sequence (FTS) on idle lanes. Any failure during the exit sequence (receiver actions, such as deskew not completed prior to timeout) stops flit transfers to the link layer and asserts a reset, which is handled by resetting the link on the next blocking link state occurrence. The SDS may also initialize the scrambler/descrambler on the lanes to appropriate values.

Low Power Link State: is a lower power state. In one embodiment, it is lower power than the partial width link state, since signaling in this embodiment is stopped on all lanes and in both directions. Transmitters may use a blocking link state for requesting a low power link state. Here, receiver may decode the request and respond with an ACK or a NAK; otherwise reset may be triggered. In some implementations, low power link state can be referred to as a L1 state.

In some implementations, state transitions can be facilitated to allow states to be bypassed, for instance, when state actions of the states, such as certain calibrations and configurations, have already been completed. Previous state results and configurations of a link can be stored and reused in subsequent initializations and configurations of a link. Rather than repeating such configurations and state actions, corresponding states can be bypassed. Traditional systems implementing state bypasses, however, often implement complex designs and expensive validation escapes. Rather than using a traditional bypass, in one example, HPI can utilize short timers in certain states, such as where the state actions do not need to be repeated. This can potentially allow for more uniform and synchronized state machine transitions among other potential advantages.

In one example, a software-based controller (e.g., through an external control point for the Physical layer) can enable a short timer for one or more particular states. For instance, for a state for which actions have already been performed and stored, the state can be short-timed to facilitate a quick exit from the state to a next state. If, however, the previous state action fails or cannot be applied within the short timer duration, a state exit can be performed. Further, the controller can disable the short timer, for instance, when the state actions should be performed anew. A long, or default, timer can be set for each respective state. If configuration actions at the state cannot be completed within the long timer, a state exit can occur. The long timer can be set to a reasonable duration so as to allow completion of the state actions. The short timer, in contrast, may be considerably shorter making it, in some cases, impossible to perform the state actions without reference back to previously-performed state actions, among other examples.

In some instances, during initialization (or re-initialization) of a link, as agents progress through a state machine toward an operational link state, one or more failures or state exits can occur that cause the state to reset (e.g., to a reset or other state). In effect, the initialization of the link can loop through one or more states without completing the initialization and entering a link state. In one example, a count can be maintained for the number of unproductive loops in state transitions within the initialization of a link. For instance, each time an initialization returns to a reset state without reaching a link state a counter can be incremented. The counter can be reset for the link once the link successfully enters a link state. Such counters can be maintained by agents on both sides of the link. Further, a threshold can be set, for instance, by a software-based controller utilizing one or more external control points. When the count of unproductive loops meets (or exceeds) the defined threshold initialization of the link can be suspended (e.g., set and held at or before the reset state). In some implementations, in order to recommence initialization and release the initialization from the suspended state, a software-based controller can trigger a restart or re-initialization of the link. In some instances, the software-based tools can analyze the nature of the suspended initialize and perform diagnostics, set register values, and perform other operations so as to guard against further looping of the initialization. Indeed, in some implementations, a controller can set a higher counter threshold or even override the counter, among other examples, in connection with restarting a suspended link initialization.

In some implementations of HPI, supersequences can be defined, each supersequence corresponding to a respective state or entry/exit to/from the respective state. A supersequence can include a repeating sequence of data sets and symbols. The sequences can repeat, in some instances, until completion of a state or state transition, or communication of a corresponding event, among other examples. In some instances, the repeating sequence of a supersequence can repeat according to a defined frequency, such as a defined number of unit intervals (UIs). A unit interval (UI) can correspond to the interval of time for transmitting a single bit on a lane of a link or system. In some implementations, the repeating sequence can begin with an electrically ordered set (EOS). Accordingly, an instance of the EOS can be expected to repeat in accordance with the predefined frequency. Such ordered sets can be implemented as defined 16 Byte codes that may be represented in hexadecimal format, among other examples. In one example, the EOS of a supersequence can be an electrically ordered electric idle ordered set (or EIEIOS). In one example, an EIEOS can resemble a low frequency clock signal (e.g., a predefined number of repeating FF00 or FFF000 hexadecimal symbols, etc.). A predefined set of data can follow the EOS, such as a predefined number of training sequences or other data. Such supersequences can be utilized in state transitions including link state transitions as well as initialization, among other examples.

As introduced above, initialization, in one embodiment, can be done initially at slow speed followed by initialization at fast speed. Initialization at slow speed uses the default values for the registers and timers. Software then uses the slow speed link to setup the registers, timers and electrical parameters and clears the calibration semaphores to pave the way for fast speed initialization. As one example, initialization can consist of such states or tasks as Reset, Detect, Polling, and Configuration, among potentially others.

In one example, a link layer blocking control sequence (i.e. a blocking link state (BLS) or L0c state) can include a timed state during which the link layer flits are held off while the PHY information is communicated to the remote agent. Here, the transmitter and receiver may start a block control sequence timer. And upon expiration of the timers, the transmitter and receiver can exit the blocking state and may take other actions, such as exit to reset, exit to a different link state (or other state), including states that allow for the sending of flits across the link.

In one embodiment, link training can be provided and include the sending of one or more of scrambled training sequences, ordered sets, and control sequences, such as in connection with a defined supersequence. A training sequence symbol may include one or more of a header, reserved portions, a target latency, a pair number, a physical lane map code reference lanes or a group of lanes, and an initialization state. In one embodiment, the header can be sent with a ACK or NAK, among other examples. As an example, training sequences may be sent as part of supersequences and may be scrambled.

In one embodiment, ordered sets and control sequences are not scrambled or staggered and are transmitted identically, simultaneously and completely on all lanes. A valid reception of an ordered set may include checking of at least a portion of the ordered set (or entire ordered set for partial ordered sets). Ordered sets may include an electrically ordered set (EOS), such as an Electrical Idle Ordered Set (EIOS) or an EIEOS. A supersequence may include a start of a data sequence (SDS) or a Fast Training Sequence (FTS). Such sets and control supersequences can be predefined and may have any pattern or hexadecimal representation, as well as any length. For example, ordered sets and supersequences may be a length of 8 bytes, 16, bytes, or 32 bytes, etc. FTS, as an example, can additionally be utilized for fast bit lock during exit of a partial width transmitting link state. Note that the FTS definition may be per lane and may utilize a rotated version of the FTS.

Supersequences, in one embodiment, can include the insertion of an EOS, such as an EIEOS, in a training sequence stream. When signaling starts, lanes, in one implementation, power-on in a staggered manner. This may result, however, in initial supersequences being seen truncated at the receiver on some lanes. Supersequences can be repeated however over short intervals (e.g., approximately one-thousand unit intervals (or ~1KUI)). The training supersequences may additionally be used for one or more of deskew, configuration and for communicating initialization target, lane map, etc. The EIEOS can be used for one or more of transitioning a lane from inactive to active state, screening for good lanes, identifying symbol and TS boundaries, among other examples.

Turning to FIG. 8, representations of example supersequences are shown. For instance, an exemplary Detect supersequence 805 can be defined. The Detect supersequence 805 can include a repeating sequence of a single EIEOS (or other EOS) followed by a predefined number of instances of a particular training sequence (TS). In one example, the EIEOS can be transmitted, immediately followed by seven repeated instances of TS. When the last of the seven TSes is sent the EIEOS can be sent again followed by seven additional instances of TS, and so on. This sequence can be repeated according to a particular predefined frequency. In the example of FIG. 8, the EIEOS can reappear on the lanes approximately once every one thousand UIs (~1KUI) followed by the remainder of the Detect supersequence 805. A receiver can monitor lanes for the presence of a repeating Detect supersequence 805 and upon validating the supersequence 705 can conclude that a remote agent is present, has been added (e.g., hot plugged) on the lanes, has awoke, or is reinitializing, etc.

In another example, another supersequence 810 can be defined to indicate a polling, configuration, or loopback condition or state. As with the example Detect supersequence 805, lanes of a link can be monitored by a receiver for such a Poll/Config/Loop supersequence 810 to identify a polling state, configuration state, or loopback state or condition. In one example, a Poll/Config/Loop supersequence 810 can begin with an EIEOS followed by a predefined number of repeated instances of a TS. For instance, in one example the EIEOS can be followed by thirty-one (31) instances of TS with the EIEOS repeating approximately every four thousand UI (e.g., ~4KUI).

Further, in another example, a partial width transmitting state (PWTS) exit supersequence 815 can be defined. In one example, a PWTS exit supersequence can include an initial EIEOS to repeat to pre-condition lanes in advance of the sending of the first full sequence in the supersequence. For instance, the sequence to be repeated in supersequence 815 can begin with an EIEOS (to repeat approximately once every 1KUI). Further, fast training sequences (FTS) can be utilized in lieu of other training sequences (TS), the FTS configured to assist in quicker bit lock, byte lock, and deskewing. In some implementations, an FTS can be unscrambled to further assist in bringing idle lanes back to active as quickly and non-disruptively as possible. As with other supersequences preceding an entry into a link transmitting state, the supersequence 815 can be interrupted and ended through the sending of a start of data sequence (SDS). Further, a partial FTS (FTSp) can be sent to assist in synchronizing the new lanes to the active lanes, such as by allowing bits to be subtracted (or added) to the FTSp, among other examples.

Supersequences, such as Detect supersequence 705 and Poll/Config/Loop supersequence 710, etc. can potentially be sent substantially throughout the initialization or re-initialization of a link. A receiver, upon receiving and detecting a particular supersequence can, in some instances, respond by echoing the same supersequence to the transmitter over the lanes. The receiving and validation of a particular supersequence by transmitter and receiver can serve as a handshake to acknowledge a state or condition communicated through the supersequence. For instance, such a handshake (e.g., utilizing a Detect supersequence 705) can be used to identify reinitialization of a link. In another example, such a handshake can be utilized to indicate the end of an electrical reset or low power state, resulting in corresponding lanes being brought back up, among other examples. The end of the electrical reset can be identified, for instance, from a handshake between transmitter and receiver each transmitting a Detect supersequence 705.

In another example, lanes can be monitored for supersequences and use the supersequences in connection with the screening of lanes for detect, wake, state exits and entries, among other events. The predefined and predictable nature and form of supersequences can be further used to perform such initialization tasks as bit lock, byte lock, debouncing, descrambling, deskewing, adaptation, latency fixing, negotiated delays, and other potential uses. Indeed, lanes can be substantially continuously monitored for such events to quicken the ability of the system to react to and process such conditions.

In one embodiment, the clock can be embedded in the data so there are no separate clock lanes. The flits sent over the lanes can be scrambled to facilitate clock recovery. The receiver clock recovery unit, as one example, can deliver sampling clocks to a receiver (i.e. the receiver recovers clock from the data and uses it to sample the incoming data). Receivers in some implementations continuously adapt to an incoming bit stream. By embedding the clock, pinout can be potentially reduced. However, embedding the clock in the in-band data can alter the manner in which in-band reset is approached. In one embodiment, a blocking link state (BLS) can be utilized after initialization. Also, electrical ordered set supersequences may be utilized during initialization to facilitate the reset, among other considerations. The embedded clock can be common between the devices on a link and the common operational clock can be set during calibration and configuration of the link. For instance, HPI links can reference a common clock with drift buffers. Such implementation can realize lower latency than elastic buffers used in non-common reference clocks, among other potential advantages. Further, the reference clock distribution segments may be matched to within specified limits.

As noted above, an HPI link can be capable of operating at multiple speeds including a "slow mode" for default power-up, initialization, etc. The operational (or "fast") speed or mode of each device can be statically set by BIOS. The common clock on the link can be configured based on the respective operational speeds of each device on either side of the link. For instance, the link speed can be based on the slower of the two device operations speeds, among other examples. Any operational speed change may be accompanied by a warm or cold reset.

In some examples, on power-on, the link initializes to Slow Mode with transfer rate of, for example, 100 MT/s. Software then sets up the two sides for operational speed of the link and begins the initialization. In other instances, a sideband mechanism can be utilized to set up a link including the common clock on the link, for instance, in the absence or unavailability of a slow mode.

A slow mode initialization phase, in one embodiment, can use the same encoding, scrambling, training sequences (TS), states, etc. as operational speed but with potentially fewer features (e.g., no electrical parameter setup, no adaptation, etc.). Slow mode operation phase can also potentially use the same encoding, scrambling etc. (although other implementations may not) but may have fewer states and features compared to operational speed (e.g., no low power states).

Further, slow mode can be implemented using the native phase lock loop (PLL) clock frequency of the device. For instance, HPI can support an emulated slow mode without changing PLL clock frequency. While some designs may use separate PLLs for slow and fast speed, in some implementations of HPI emulated slow mode can be achieved by allowing the PLL clock to runs at the same fast operational speed during slow mode. For instance, a transmitter can emulate a slower clock signal by repeating bits multiple times so as to emulate a slow high clock signal and then a slow low clock signal. The receiver can then oversample the received signal to locate edges emulated by the repeating bits and identify the bit. In such implementations, ports sharing a PLL may coexist at slow and fast speeds.

In some implementations of HPI, adaptation of lanes on a link can be supported. The Physical layer can support both receiver adaptation and transmitter, or sender, adaptation. With receiver adaptation, the transmitter on a lane can send sample data to the receiver which the receiver logic can process to identify shortcomings in the electrical characteristics of the lane and quality of the signal. The receiver can then make adjustments to the calibration of the lane to optimize the lane based on the analysis of the received sample data. In the case of transmitter adaptation, the receiver can again receive sample data and develop metrics describing the quality of the lane but in this case communicate the metrics to the transmitter (e.g., using a backchannel, such as a software, hardware, embedded, sideband or other channel) to allow the transmitter to make adjustments to the lane based on the feedback.

In one example implementation, supersequences can be scrambled. For instance, portions of a supersequence, such as TS payloads, can be scrambled by XORing those portions with a random or pseudo random sequence. Other portions of the supersequence (e.g., the EIEOS, TS header, FTS, etc.) can be left unscrambled. In one example, a pseudo random binary sequence can be utilized with at least 23 bits (PRBS23). The PRBS can be generated according to a particular selected polynomial. In one example, the PRBS can be generated by a similar bit size, self-seeded storage element, such as a linear feedback shift register (LFSR). The LFSR can be a 23-bit Fibonacci LFSR capable of generating a PRBS sequence of over 8 Mb in length. The PRBS can repeat following the end of the sequence. In some implementations, the entirety of the PRBS23 sequence can be used in the scrambling of training sequences included in supersequences used, for instance, in initialization of the link, including adaptation.

While the full length of a PRBS sequence can be used, in some implementations, HPI can support allowing the use of varying lengths of the available PRBS sequence (e.g., the use of only a portion of the PRBS23 sequence). In some examples, a controller of a device can specify that only a portion of the full length of a PRBS sequence be utilized. This can be desirable, for instance, in testing applications where repeatability of bit sequences is desired, among potentially other applications. A software-based controller can specifying varying lengths of the PRBS to be applied. For instance, BIOS of a device can specify the PRBS length to be applied on the link. In some implementations, use of the full length of the PRBS sequence can be the default setting, for instance, so as to maximize the benefits of the lengthy PRBS sequence.

Lane traffic in a transmitting link state (TLS) and training sequences can be scrambled with a PRBS of a particular minimum length (e.g., 23 bits). The starting seed applied to a stream can be varied between the lanes to enhance the electrical benefits of the PRBS on the link. In one example implementations, the PRBS can be generated by a 23 bit Fibonacci LFSR implementing a 6-tap generator polynomial, such as, $(x^{23}+x^{21}+x^{16}+x^8+x^5+x^2+1)$.

In adaptation, a transmitter of an agent can transmit to a remote receiver a random, or pseudo random pattern. In some instances, scrambled supersequences can be used as the pattern. Logic at the receiver can determine characteristics of one or more lanes of the link and generate metric data describing such characteristics. In the case of receiver adaptation, the receiver can attempt to determine optimal configurations for a lane based on the metrics and apply these configurations at the receiver. In the case of transmitter adaptation, the receiver can communicate metrics to the transmitter for use by the transmitter agent to configure and adapt the lane based on the metric. In either instance, in some implementations, hardware or software can be utilized to assess different transmitter settings in algorithmic order to determine the optimal settings.

Receiver adaptation can be initiated at the start of the Polling state using the Polling supersequence sent from the remote transmitter. Similarly, transmitter adaptation can be done by repeating the following for each transmitter parameters. Both agents can enter Loopback Pattern state as masters and transmit specified pattern. Further, both receivers can measure the metric (e.g. BER) for that particular transmitter setting at a remote agent. Both agents can go to Loopback Marker state and then Reset and use backchannels (slow mode TLS or sideband) to exchange metrics. Based on these metrics, the next transmitter setting can be identified. Eventually the optimal transmitter setting can be identified and saved for subsequent use.

In some implementations, a timer can be used during adaptation. At the conclusion of a predefined timer value, adaptation can be ended, under the assumption that the time value was sufficiently long to permit the transmitter and receiver to have concluded adaptation tasks and successfully adapt the lane. In other implementations, an alternate approach can be utilized to improve the efficiency of adaptation of a link. For instance, in one example, a handshake can be employed to tailor the time spent in adaptation to the time actually used to complete adaptation. In one example, a receiver at a first agent responsible for generating metrics from a sample sent by the transmitter, can send a signal notifying the transmitter that the receiver approves the configuration of the link (or lane(s)) whether adaptation was performed by the receiver or transmitter. Upon receiving the signal, the transmitter can complete the handshake by sending an acknowledgement signal. In some instances, the acknowledgement can indicate similar approval of the link configuration at the transmitter agent, among other examples.

Metric information and other feedback can be communicated from a receiver agent to a transmitter agent in connection with adaptation of a link through a variety of mechanisms. The transmitter, in the case of transmitter adaptation, can identify changes that can be made to one or more attributes of the lane so as to improve the characteristics of the lane. The transmitter can make these changes and send additional sample data on the lanes reflecting these changes. The receiver can then provide additional metric data or feedback, in some instances, to report the quality of the changes. In one example, a receiver can provide metric information through a backchannel. In one example, such a backchannel can be implemented as a software-based backchannel by sending the link (or one or more lanes) into slow mode allowing software tools to analyze the quality of a sample received from the transmitter. The software tool can cause metric information or a configuration recommendation to be communicated to the transmitter agent. This can be accomplished through an in-band communication, software-to-software message, or other means. In another example, a side band channel can be used (when available on the device(s)) as the backchannel. In still another example, a hardware-based channel can be used as the backchannel, such as by reserving one lane between two agents for transmission of the sample and reserving a second lane (at least during an adaptation event) for transmission of the feedback metric data. In still a further example, an embedded channel can be utilized that leverages a control or BLS window for the sending of feedback metric data. The control window can be set to slow mode (e.g., to enable analysis by software), in some examples, while the control interval communicates the sample at operation speed, among other potential examples.

In some instances, adaptation can include the sending of a PRBS (or a PRBS scrambled portion of a supersequence) by the transmitter to the receiver in a Master-Master loopback state. Both agents on a lane can lock to the PRBS and use the sequence as an reference sequence for adaptation. One or both agents can receive the reference sequence and determine whether the reference sequence was reproduced properly at the agent's receiver. One or both agents can then respectively assess the quality of the lane based on a comparison of the received sequence with the expected reference sequence. For instance, a bit error rate can be determined for the lane based on the comparison. Additionally, logic at the transmitter (or at the receiver) can deliberately inject jitter, noise, or other characteristics to the signal prior to sending during the loopback to test the quality of the lane (e.g., whether the signal can still be understood at the receiver despite the noise), among other features. The results of such assessments, including a determined bit error rate, can be included in metric data used to adapt the link.

Self tests can be performed through functionality provided in some implementations of HPI (e.g., Interconnect Built-In Self Test (MIST)). Supersequences can be utilized in such self tests. For instance, a transmitter or master can send a pattern including all or a portion of a supersequence, a PRBS sequence, or other sequence. The length and repeatability of such sequences can be controlled in some instances, allowing the full length of a particular sequence to be applied in some instances, while applying only a partial (and repeating) portion of the sequence in other instances. In some examples, a PRBS23 or sequence scrambled using PRBS23 can be utilized in self tests of a link. Additionally, start end points of a sequence can be particularly selected and used in self tests and other functions. Further, multiple non-correlated data sequences can be made available through some implementations of HPI allowing different data sequences to be applied on adjacent lanes. In one example, multiple non-correlated versions of a PRBS can be provided, such as four or more sequences, among other examples As noted above, loopback can be used in a variety of tasks, including testing, adaptation, initialization, etc. Synchronization of two agents in loopback can be difficult in some instances. For instance, an agent of a receiver may be originating data, such as particular training sequences, supersequences, etc. Further, upon entering loopback, the receiver may splice data it has originated with the data it is to loopback, such as training sequences that it is to loopback. In one example, a transmitter or master in loopback can include logic to transition from a lock on TS originated by the receiver agent to lock on looped-back TS. Such TS locking can present the threat of aliasing and other issues. In one example, a TS, such as the payload of a TS can be formatted to assist in remediating the risk of aliasing or otherwise confusing previous TSes with newly looped-back TSes. For instance, in one example, a TS can be provided with a suffix of zeroed data that can include bytes used for descrambling as well as other dual-use reserved bytes. Such zeroed bytes can be additionally used to reduce or eliminate (statistically) the risk that the newly looped-back TS will be missed among data spliced by the receiver and originating from the receiver, among other examples. In loopback, a master can check the integrity of its patterns and relock after loopback, for instance, through the use of a NAK-ACK handshake with NAK TS with unchanged payload and handshake (ACK) used for in-band parameter payload. Further, master-master loopback can also be supported, with TS format being used in TS lock at each side of a master-master loopback.

In some implementations of HPI, design for test features can be provided. In one embodiment, HPI includes hooks to enable post-design test, debug, and validation. An exemplary, non-exhaustive list of such features is included below. Note that the following features are provided by way of example, as some may be omitted, and others may be added, etc.:

Single Step: Single step includes a debug feature where software may step agents through the initialization states to a link state, such as TLS. A storage element, register, or signal (that is software accessible) may enable this mode. In this mode the agent may set a semaphore on entering a state and perform the state actions. But when an exit condition is reached (including secondary timeouts), the sempaore can cause a next state transition to not be taken. Here, the actual transition may occur at the direction of a software-based controller, such as by clearing the semaphore. This potentially allows software to examine the Physical layer during progress to a transmitting state or Loopback. Note that this may be extended to substates by setting a substate sempahore on entry to a substate, among other examples. The agent may remain in a current state as long as a semaphore, such as a bit in a register, is set. Transition out of every state may be delayed until the hold bit is cleared by an outside agent. State rules defined exit criteria can otherwise be maintained except in cases involving time-outs, etc. The secondary timers may be disabled (e.g., ignored). Here, the clearing of the hold bit can be considered a replacement stimulus emulating the secondary timer time-out for single stepping operation, among other examples. Further, single stepping with the assistance of software can be performed in a manner that supports integrity of the forward progress.

Freeze on Initialization Abort: This is a debug feature where the agent does not immediately take the transition to a reset state on an initialization abort, delaying or suspending the transition so that software-based tools can identify causes for the abort. For instance, software-based tools can be used to probe reasons for an abort while supporting integrity of the regress and reinitialization. One or more fields of a register holding one or more bits, such as a control register, may control this action. This feature complements single step by giving software control to state exits due to failure (as single step does in case of normal progress). In one embodiment, by default, a Physical layer state machine may retry by immediately transitioning to a reset state after any initialization abort. However, the state machine may be frozen (that is, remain in the same state) at the point of failure, not transition to a reset state by setting initialization abort freeze bit in a register. As an example, when in freeze on initialization abort mode, when an initialization abort occurs, the state machine freezes by setting state machine hold bit, such as the semaphore described above, in a register. Software, in one embodiment, can access registers to read the stopped state and other frozen resources and use the frozen state to debug the state machine. Clearing the hold bit in this frozen state may result in the state machine exiting to Reset. In-band reset, in one embodiment, does not release the hold.

Automated Test Equipment (ATE): Automated Test Equipment (ATE) may be used to characterize (e.g., margin) the link in the various states including TLS. In this case the ATE can act as an agent and use a predetermined set of transmit patterns to get the device under test (DUT) into TLS. In ATE mode, an ATE mode field to hold one or more bits in a register can be set. The DUT does the same state actions but when an exit condition is reached, the next state transition is not taken and the actual transition occurs when the secondary timeout occurs. Thus, this mode is similar to single step except that transitions occur on pre-programmed timeouts instead of software intervention. For instance, ATE mode can manage a programmable timer based progression thru the states. Longer timers set during the mode can allow handshakes in states to complete while still exiting at time specified by software managing or otherwise used in the ATE mode.

In some instances, high volume manufacturing (HVM) tests may be performed by connecting the transmitter of a DUT port to its own receiver and getting this link pair to TLS where signature patterns for each initialization mode (except loopback or compliance slave) are sent and checked to pass or fail the DUT. This can be accomplished without a special mode, but latency fixing may be performed for checking signature at the correct cycle.

IBIST (Interconnect Built in self test): IBIST uses compliance and loopback states to test the interconnect with built in pattern generators and checkers.

Compliance: An agent may be made a Compliance master or slave for validation purposes. The agent enters Compliance from the transmitter calibrate state (TCS). The slave loops back incoming data from the master after re-timing it to its local clock (without undo of any polarity inversion or lane reversal). The master sends a compliance pattern and receives it looped back from the slave. The master may be sent to Loopback Pattern to try out more specialized patterns. The master may also be used without a slave so that its transmitter can be characterized. Typical use of Compliance is to characterize operation of the analog front end on some subset of lanes when loopback is not functional. Compliance state may be utilized for jitter or noise investigation, debug, exploring a link, etc. The Compliance state can drive a supersequence with a transmitter from the master. Receiver looks for a wake on a monitor lane, debounces the wake, drops bad lanes, adapts, and bit locks, etc. The slave transmitter can drive the compliance pattern until its receiver actions are complete. Then loop-back is re-timed and non-deskewed. Slave receiver does similar monitor and debounce, etc. actions. Exit may be to a reset state, such as a timed reset, or to a loopback pattern state to start the test, among other examples.

Loopback: An agent may be made into a Loopback master for detailed validation of a subset of lanes. After successful polling, the master enters Loopback with a subset of lanes and the other agent also enters Loopback but as the slave. Loopback Master may communicate its intent to enter loopback using a loopback master bit in a polling training sequence (TS). An agent which is not loopback master and receives this bit in TS polling may become a loopback slave.

At the end of Polling, both connected ports enter a Loopback Marker state (LMS). From there, the master takes the slave to a Loopback Pattern State, where it sends patterns and checks them after they are looped back by the slave. The loopback slave loops back deskewed data (unlike compliance slave). The state machine may stay in Loopback indefinitely performing one test after the other. This enables cascading tests without losing bit lock. Tx adaptation may also use the loopback pattern generation and checking capabilities. During TX adaptation, both agents act as masters, but TX sends pattern and Rx checks for bit errors in one scenario.

Figure 10:
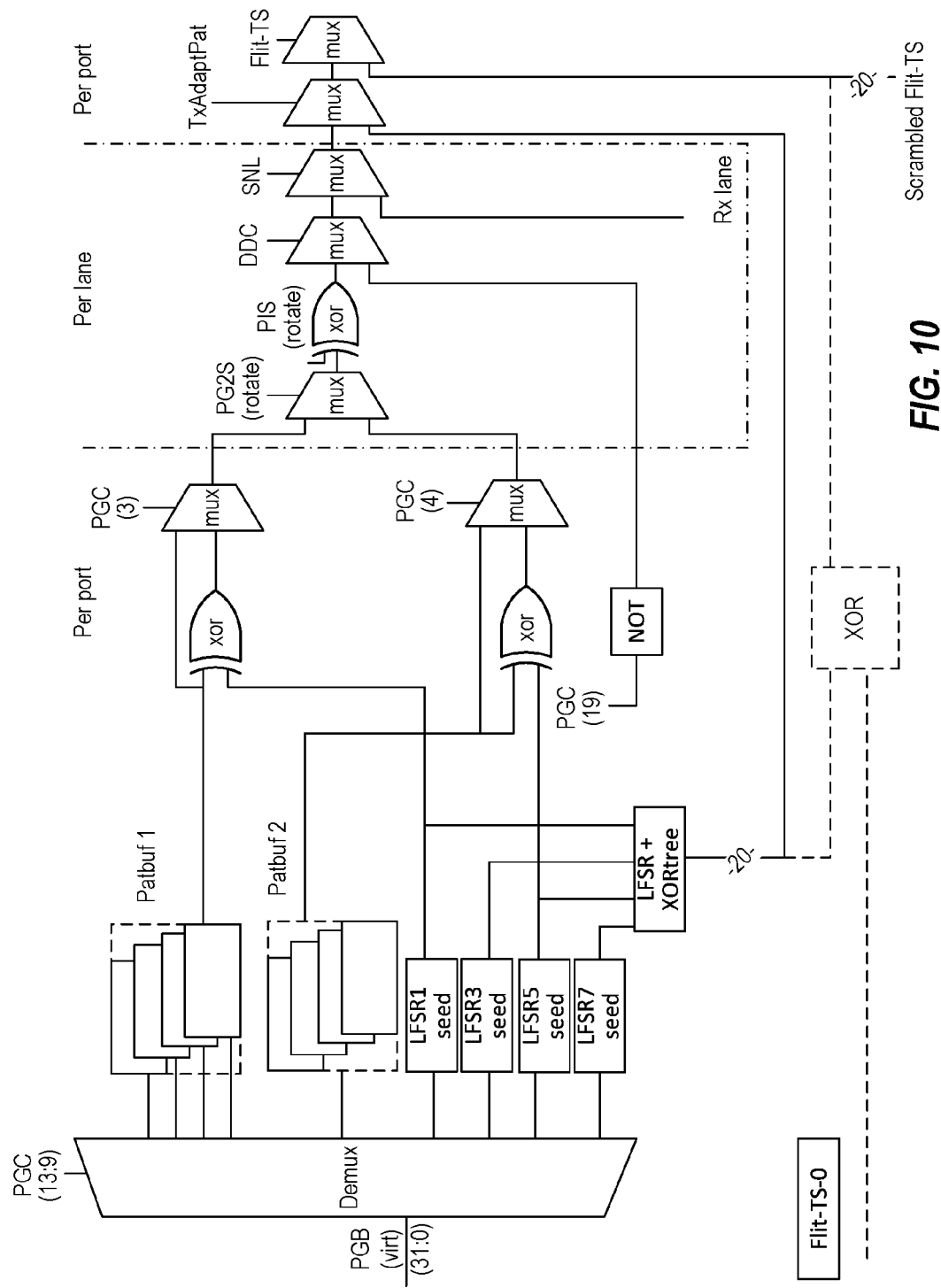
FIG. 10 illustrates a schematic diagram of an example pattern generator.

Pattern Generation: Pattern generators may be activated in Compliance and Loopback states. In one embodiment, a pattern generator, such as the example pattern generator illustrated in the simplified block diagram of FIG. 10, can includes one or more pattern buffers, each having a specified size (e.g. 128 bits) and a plurality of 23-bit (or other length) LFSR seed buffers accessed through a structure, such as a register. The words of pattern generators may be indirectly addressed through pattern buffer selection.

In one example implementation, the content of a pattern buffer is sent in each of the enabled lanes serially starting with least significant bit first. Each lane may select any buffer utilizing a register mechanism. All the lanes selecting the same pattern buffer transmit the same data in a UI. Each pattern buffer may also be independently scrambled by a 23 bit pseudo random generator, which is enabled using bits in a register, such as a pattern control register. The transmission in any lane may be inverted individually using a Pattern Invert Selection Register, for instance. An auto inversion feature may be enabled to generate cross talk pattern using auto inversion enable bit of a Pattern Generator Control Register, among other examples. For transmitter adaptation using loopback, the staggered PRBS23 pattern can be selected. This pattern may also be used to scramble the flits in low power state. The number of patterns sent may be more than the loop count in pattern generator control register, as a loop count refers to the total number of 128 bit patterns received. The master may send an integral number of 128 UI patterns. The pattern generator content can be transmitted continuously until at least one of three exit conditions occurs: (i) if the loop count status is equal to the Exponential Loop count; (ii) Stop On Error is set in the register and an error on any Lane has occurred; or (iii) Stop Test is set in the register. By default, transmitter lanes that have not been detected as indicated by lane dropped in a Transmitter Data Lane Dropped Status Register and dropped receiver lanes as indicated by receiver lane dropped in the Receiver Data Lane Dropped Status Register do not transmit or compare any patterns. If the Include Dropped Lanes bit is set in the Pattern Generator Control Register, dropped lanes also drive and check patterns in Loopback Pattern State. Disabled lanes may not participate in testing. Further, slave transmitter lane content can be controlled via the Slave Loopback Path Select Register to either loopback the content from the Rx lane or to select the pattern generator. In some instances, there may be no alignment requirement between the looped back data and the slave generated pattern, among other features, structures, and examples.

Pattern Check and Error Counting: Pattern checking can be enabled in a Loopback Pattern. Each receiver lane can compare the received data against transmitted data in a corresponding transmitter lane. The slave side checking can be achieved by programming the same exact pattern generation values in both the Loopback Master and Slave. Start of checking and pattern buffer scrambling can be marked by the end of SDS. Each lane can choose to compare or not depending on a register value. The number of patterns checked can be controlled by a loop count. Every count indicates 128 bits of pattern buffer data. The loop counter can have 5 bits of exponent count to enable testing for long time. Loop count value of zero corresponds to infinite count, in which case, a test can only be terminated by setting the Stop Test bit, in some implementations. In order to accommodate electrical parameter application that is synchronized upon entry to Loopback Pattern, the checking can be masked for a time specified by time value in the Pattern Checker Control Register. Checking can be made selective on any one bit in an interval using selective error check start and selective error check interval in the Pattern Checker Control Register.

During transmitter adaptation in loopback, both agents can act as masters but transmitter sends the pattern and the receiver checks for bit errors. Another difference is that Start Test can be set prior to entering loopback and a structure can be used to delay the actual start of test in Loopback marker (sending SDS). In Loopback Pattern when loop count expires, ending the transmitter adaptation test, the agent can return to the Loopback marker, wait for timeout and then exit to Reset for backchannel operation. When a series of transmitter parameters are being tried, the agent may go back to Loopback Pattern instead of Reset till the last parameter has been tried, among other examples.

Error counting can be performed collectively by per lane and global counters. Error counters can be accessible through the Lane Error Counter Register. The lane being observed and selected toward global counter can be indicated by the Receiver Error Counter Lane Select field in the Pattern Checker Control Register. The least significant 8 bits of the error counter can be available for every lane. The most significant 23 bits of the Lane Error Counter Register can only be available for the selected lane indicated by Receiver Error Counter Lane Select at the time when the state machine enters Loopback Pattern. The Lane Error Counter Register does not stick at the maximum value but instead rolls over to all 0's which is indicated by setting the overflow flag (e.g., bit 31 of Lane Error Counter Register) on a per lane basis. Per lane counters in non-selected lanes freeze on maximum error count can mark an overflow. Initial masking, selective error checking, and Loopcount Stall can also apply to error counters. Software may manually clear the Lane Error Counter Register by writing all 1's to bits 31:0, among other examples.

Lane Reversal: If lane reversal or polarity inversion is detected at a receiver in Polling, pattern checking (and loopback, if slave) may be done after undoing the reversal and polarity inversion of lanes.

Agent Loopback Marker State: Loopback marker is an agent state but unlike other agent states master and slave actions and exits may be different. Loopback slave may undo any polarity inversion and/or lane reversal but may not descramble or rescramble looped back bits. Acknowledgment exchange may not apply to slave since it is looping back. Since slave may deskew before looping back on symbol boundary, master may not be forced to re-bytelock or re-deskew but the master may re-lock training sequence to avoid locking to some alias. Means to do this may include re-seeding of LFSR, comparing TS and/or EIEOS or some combination of these. The end of the SDS marks the end of loopback setup and the start of pattern generation, checking and counting.

Agent Loopback Pattern State (or Block Link State): In this state, instead of control patterns, a master transmitter can send a MIST pattern and its receiver can check for errors in received pattern. For transmitter adaptation both agents can be masters. For a predetermined period, the transmitter can sends a pattern and a remote receiver can compare this pattern and determine a figure of merit or metric for the received pattern which is recorded in a storage element, such as a register. The comparison method and metric may be design dependent (e.g., BER with jitter injection). At the end of the period, both agents can exit to Reset for the backchannel to examine the metric and set up the next iteration of transmitter adaptation.

Lane Enable/Disable: Lanes can be disabled at the transmitter, receiver, or both to cause the link to operate at lower width. It maybe the responsibility of a software-based controller or tool to disable correct lanes if they are reversed.

As noted above, both timers and controls (e.g., control signals, handshakes, etc.) can be used to facilitate transitions within a state machine defined on agents within an HPI environment. For instance, timers can be used in some state transitions while signaling can be used in other state transitions. Further, mechanisms can be provided for facilitating state transitions. For instance, as introduced above, an ATE mode or other testing mode can be provided in some implementations that can override some state transition mechanisms, for instance, to assist in management and observation of a test of the system. For example, in one example testing mode, all state transitions can be set, by a test or test administrator, according to a respective timer. Logic can also be provided to assist in configuring states that would ordinarily transition on a control signal to transition based on a defined timer, among other examples. Such other examples can include, for instance, software-controller state transitions such as single stepping (e.g., through freeze on initialization abort), and other examples.

As introduced above, a BLS or L0c window can be utilized to communicate various control codes, signals, and other data, including within test, initialization, and error checking applications. A predefined set of BLS codes can be defined that can be communicated within the brief window of UIs provided through BLS. However, transients, transmission line irregularities, and other factors can result in bit errors that can potentially cause the control codes to be corrupted or misinterpreted. Logic can be provided on agents on a link to perform some degree of error detection and correction to account for more minor errors in interpreting and processing control codes. If the logic is still unable to make sense of definitively resolve a control code error, a mismatch can result. In some implementations of HPI, features can be provided to respond to the potential catastrophic side effects of a mismatch. For instance, in one embodiment, upon detection of a mismatch, a link can be suspended, including the sending of potentially corrupted flits, adaptation, and other communications. The link can then be automatically transitioned into a reset mode at the end of the next BLS (or L0c) interval, among other examples.

As both devices on a link can run off the same reference clock (e.g., ref clk), elasticity buffers can be omitted (any elastic buffers may be bypassed or used as drift buffers with lowest possible latency). However, phase adjustment or drift buffers can be utilized on each lane to transfer the respective receiver bitstream from the remote clock domain to the local clock domain. The latency of the drift buffers may be sufficient to handle sum of drift from all sources in electrical specification (e.g., voltage, temperature, the residual SSC introduced by reference clock routing mismatches, and so on) but as small as possible to reduce transport delay. If the drift buffer is too shallow, drift errors can result and manifest as series of CRC errors. Consequently, in some implementations, a drift alarm can be provided which can initiate a Physical layer reset before an actual drift error occurs, among other examples.

Some implementations of HPI may support the two sides running at a same nominal reference clock frequency but with a ppm difference. In this case frequency adjustment (or elasticity) buffers may be needed and can be readjusted during an extended BLS window or during special sequences which would occur periodically, among other examples.

The operation of the HPI PHY logical layer can be independent of the underlying transmission media provided the latency does not result in latency fixing errors or timeouts at the link layer, among other considerations.

External interfaces can be provided in HPI to assist in management of the Physical layer. For instance, external signals (from pins, fuses, other layers), timers, control and status registers can be provided. The input signals may change at any time relative to PHY state but are to be observed by the Physical layer at specific points in a respective state. For example, a changing alignment signal (as introduced below) may be received but have no effect after the link has entered a transmitting link state, among other examples. Similarly command register values can be observed by Physical layer entities only at specific points in time. For instance, Physical layer logic can take a snapshot of the value and use it in subsequent operations. Consequently, in some implementations, updates to command registers may be associated with a limited subset of specific periods (e.g., in a transmitting link state or when holding in Reset calibration, in slow mode transmitting link state) to avoid anomalous behavior.

Since status values track hardware changes, the values read may depend on when they are read. Some status values, however, such as link map, latency, speed, etc., may not change after initialization. For instance, a re-initialization (or low power link state (LPLS), or L1 state, exit) is the only thing which may cause these to change (e.g., a hard lane failure in a TLS may not result in reconfiguration of link until re-initialization is triggered, among other examples).

Interface signals can include signals that are external to but affect Physical layer behavior. Such interface signals can include, as examples, encoding and timing signals. Interface signals can be design specific. These signals can be an input or output. Some interface signals, such as termed semaphores and prefixed EO among other examples, can be active once per assertion edge, i.e., they may be deasserted and then reasserted to take effect again, among other examples. For instance, Table 1 includes an example listing of example functions:

TABLE 1

| Function |
| --- |
| input pin reset (aka warm reset) |
| input pin reset (aka cold reset) |
| input in-band reset pulse; causes semaphore to be set; semaphore is cleared when in-band reset occurs |
| input enables low power states |
| input loopback parameters; applied for loopback pattern |
| input to enter PWLTS |
| input to exit PWLTS |
| input to enter LPLS |
| input to exit LPLS |

TABLE 1-continued

| Function |
|---|
| input from idle exit detect (aka squelch break) |
| input enables use of CPhyInitBegin |
| input from local or planetary alignment for transmitter to exit initialization |
| output when remote agent NAKs LPLS request |
| output when agent enters LPLS |
| output to link layer to force non-retryable flits |
| output to link layer to force NULL flits |
| output when transmitter is in partial width link transmitting state (PWLTS) |
| output when receiver is in PWLTS |

CSR timer default values can be provided in pairs—one for slow mode and one for operational speed. In some instances, the value 0 disables the timer (i.e., timeout never occurs). Timers can include those shown in Table 2, below. Primary timers can be used to time expected actions in a state. Secondary timers are used for aborting initializations which are not progressing or for making forward state transitions at precise times in an automated test equipment (or ATE) mode. In some cases, secondary timers can be much larger than the primary timers in a state. Exponential timer sets can be suffixed with exp and the timer value is 2 raised to the field value. For linear timers, the timer value is the field value. Either timer could use different granularities. Additionally, some timers in the power management section can be in a set called a timing profile. These can be associated with a timing diagram of the same name.

| Timers |
|---|
| Table Tpriexp Set |
| Reset residency for driving EIEOS |
| Receiver calibration minimum time; for stagger transmitter off |
| Transmitter calibration minimum time; for stagger on |
| Tsecexp Set |
| Timed receiver calibration |
| Timed transmitter calibration |
| Squelch exit detect/debounce |
| DetectAtRx overhang for handshake |
| Adapt + bitlock/bytelock/deskew |
| Configure link widths |
| Wait for planetary aligned clean flit boundary |
| Re-bytelock/deskew |
| Tdebugexp Set |
| For hot plug; non-0 value to debug hangs |
| TBLSentry Set |
| BLS entry delay - fine |
| BLS entry delay - coarse |
| TBLS Set |
| BLS duration for transmitter |
| BLS duration for receiver |
| BLS clean flit interval for transmitter |
| TBLS clean flit interval for receiver |

Command and control registers can be provided. Control registers can be late action and may be read or written by software in some instances. Late-action values can take effect (e.g., pass through from software-facing to hardware-facing stage) continuously in Reset. Control semaphores (prefixed CP) are RW1S and can be cleared by hardware. Control registers may be utilized to perform any of the items described herein. They may be modifiable and accessible by hardware, software, firmware, or a combination thereof.

Status registers can be provided to track hardware changes (written and used by hardware) and can be read-only (but debug software may also be able to write to them). Such registers may not affect interoperability and can be typically complemented with many private status registers. Status semaphores (prefixed SP) can be mandated since they may be cleared by software to redo the actions which set the status. Default means initial (on reset) values can be provided as a subset of these status bits related to initialization. On an initialization abort, this register can be copied into a storage structure.

Tool Box registers can be provided. For instance, testability tool-box registers in the Physical layer can provide pattern generation, pattern checking and loop back control mechanisms. Higher-level applications can make use of these registers along with electrical parameters to determine margins. For example, Interconnect built in test may utilize this tool-box to determine margins. For transmitter adaptation, these registers can be used in conjunction with the specific registers described in previous sections, among other examples.

In some implementations, HPI supports Reliability, Availability, and Serviceability (RAS) capabilities utilizing the Physical layer. In one embodiment, HPI supports hot plug and remove with one or more layers, which may include software. Hot remove can include quiescing the link and an initialization begin state/signal can be cleared for the agent to be removed. A remote agent (i.e. the one that is not being removed (e.g., the host agent)) can be set to slow speed and its initialization signal can also be cleared. An in-band reset (e.g., through BLS) can cause both agents to wait in a reset state, such as a Calibrate Reset State (CRS); and the agent to be removed can be removed (or can be held in targeted pin reset, powered down), among other examples and features. Indeed, some of the above events may be omitted and additional events can be added.

Hot add can include initialization speed can default to slow and an initialization signal can be set on the agent to be added. Software can set speed to slow and may clear the initialization signal on the remote agent. The link can come up in slow mode and software can determine an operational speed. In some cases, no PLL relock of a remote is performed at this point. Operational speed can be set on both agents and an enable can be set for adaptation (if not done previously). The initialization begin indicator can be cleared on both agents and an in-band BLS reset can cause both agents to wait in CRS. Software can assert a warm reset (e.g., a targeted or self-reset) of an agent (to be added), which may cause a PLL to relock. Software may also set the initialization begin signal by any known logic and further set on remote (thus advancing it to Receiver Detect State (RDS)). Software can de-assert warm reset of the adding agent (thus advancing it to RDS). The link can then initialize at operational speed to a Transmitting Link State (TLS) (or to Loopback if the adaption signal is set), among other examples. Indeed, some of the above events may be omitted and additional events can be added.

Data lane failure recovery can be supported. A link in HPI, in one embodiment, can be resilient against hard error on a single lane by configuring itself to less than full width (e.g. less than half the full width) which can thereby exclude the faulty lane. As an example, the configuration can be done by link state machine and unused lanes can be turned off in the configuration state. As a result, the flit may be sent across at a narrower width, among other examples.

In some implementations of HPI, lane reversal can be supported on some links. Lane reversal can refer, for instance, to lanes 0/1/2 . . . of a transmitter connected to lanes n/n−1/n−2 . . . of a receiver (e.g. n may equal 19 or 7, etc.). Lane reversal can be detected at the receiver as identified in a field of a TS header. The receiver can handle the lane reversal by starting in a Polling state by using physical lane n . . . 0 for logical lane 0 . . . n. Hence, references to a lane may refer to a logical lane number. Therefore, board designers may more efficiently lay down the physical or electrical design and HPI may work with virtual lane assignments, as described herein. Moreover, in one embodiment, polarity may be inverted (i.e. when a differential transmitter +/− is connected to receiver −/+. Polarity can also be detected at a receiver from one or more TS header fields and handled, in one embodiment, in the Polling State.

Figure 11:
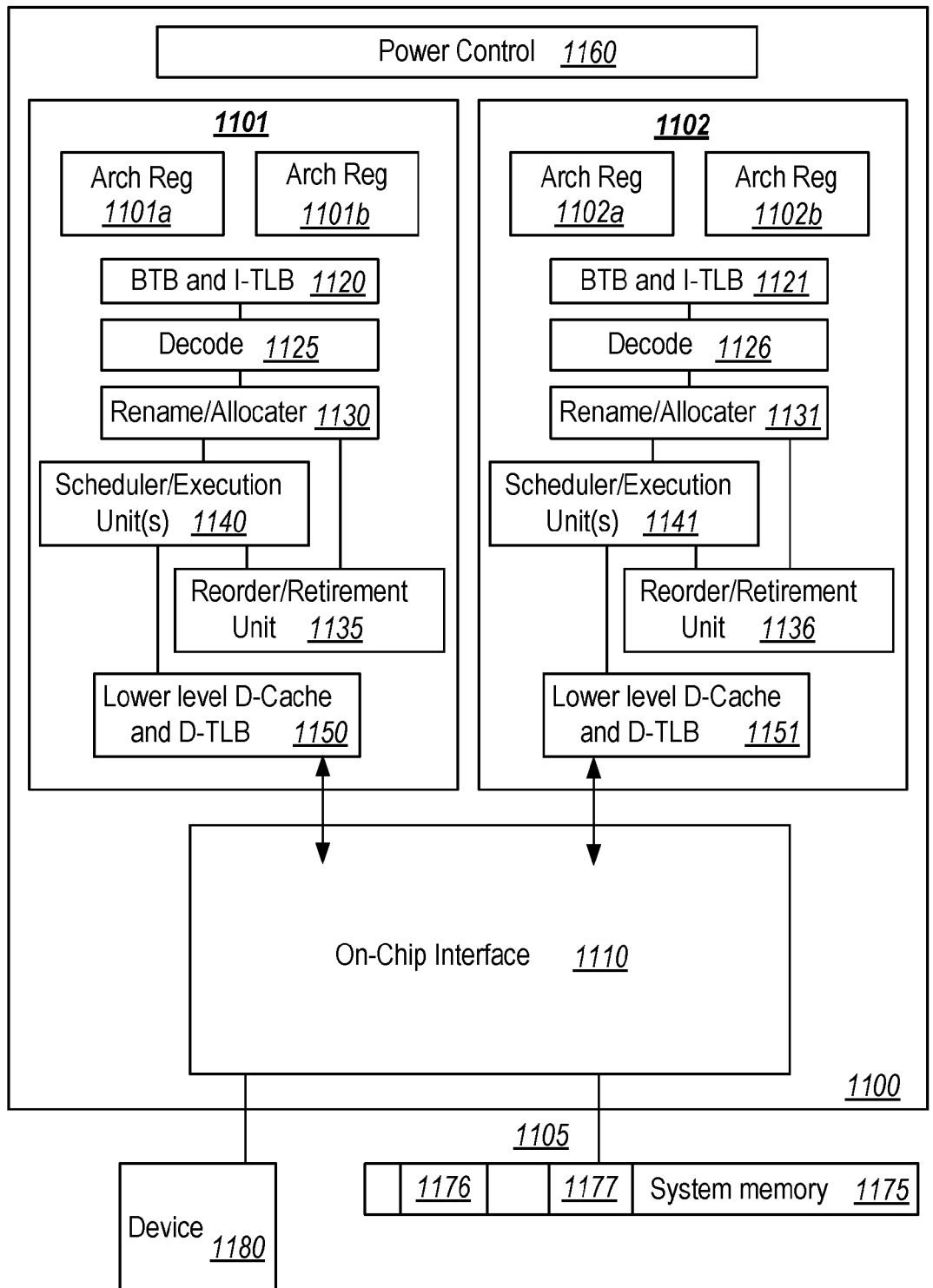
FIG. 11 illustrates an embodiment of a block diagram for a computing system including a multicore processor.

Referring to FIG. 11, an embodiment of a block diagram for a computing system including a multicore processor is depicted. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—core 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 11, includes two cores—core 1101 and 1102. Here, core 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1101 are described in further detail below, as the units in core 1102 operate in a similar manner in the depicted embodiment.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 11, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, as discussed in more detail below decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1126, in one embodiment, recognize the same ISA (or a subset thereof). Alternatively, in a heterogeneous core environment, decoders 1126 recognize a second ISA (either a subset of the first ISA or a distinct ISA).

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache, such as a second level cache associated with on-chip interface 1110. Note that higher-level or further-out refers to cache levels increasing or getting further way from the execution unit(s). In one embodiment, higher-level cache is a last-level data cache—last cache in the memory hierarchy on processor 1100—such as a second or third level data cache. However, higher level cache is not so limited, as it may be associated with or include an instruction cache. A trace cache—a type of instruction cache—instead may be coupled after decoder 1125 to store recently decoded traces. Here, an instruction potentially refers to a macro-instruction (i.e. a general instruction recognized by the decoders), which may decode into a number of micro-instructions (micro-operations).

In the depicted configuration, processor 1100 also includes on-chip interface module 1110. Historically, a memory controller, which is described in more detail below, has been included in a computing system external to processor 1100. In this scenario, on-chip interface 111 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1100. For example in one embodiment, a memory controller hub is on the same package and/or die with processor 1100. Here, a portion of the core (an on-core portion) 1110 includes one or more controller(s) for interfacing with other devices such as memory 1175 or a graphics device 1180. The configuration including an interconnect and controllers for interfacing with such devices is often referred to as an on-core (or un-core configuration). As an example, on-chip interface 1110 includes a ring interconnect for on-chip communication and a high-speed serial point-to-point link 1105 for off-chip communication. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

In one embodiment, processor 1100 is capable of executing a compiler, optimization, and/or translator code 1177 to compile, translate, and/or optimize application code 1176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 12:
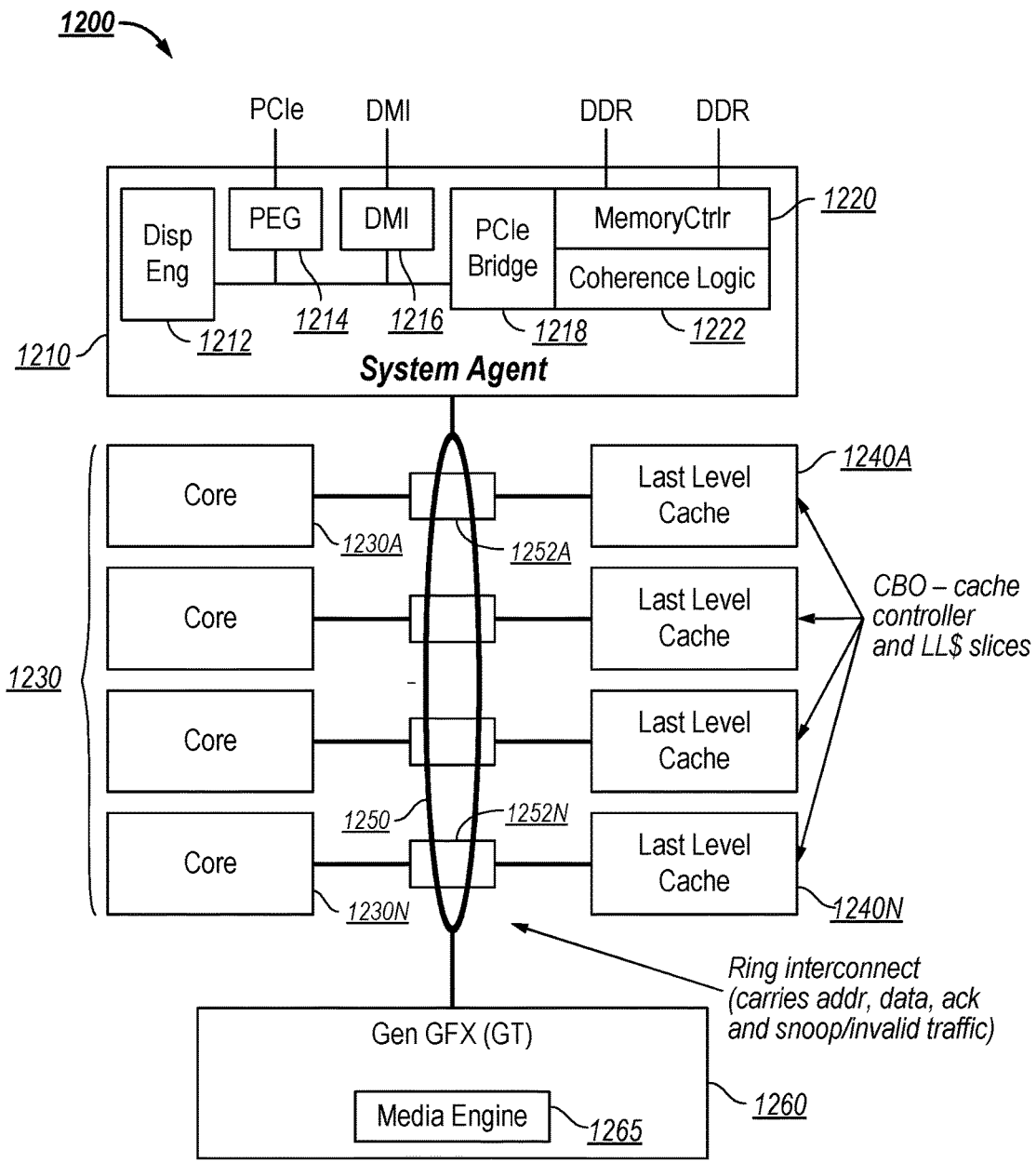
FIG. 12 illustrates another embodiment of a block diagram for a computing system including a multicore processor.

Referring now to FIG. 12, shown is a block diagram of an embodiment of a multicore processor. As shown in the embodiment of FIG. 12, processor 1200 includes multiple domains. Specifically, a core domain 1230 includes a plurality of cores 1230A-1230N, a graphics domain 1260 includes one or more graphics engines having a media engine 1265, and a system agent domain 1210.

In various embodiments, system agent domain 1210 handles power control events and power management, such that individual units of domains 1230 and 1260 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1230 and 1260 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1230 further includes low level caches in addition to various execution units and additional processing elements. Here, the various cores are coupled to each other and to a shared cache memory that is formed of a plurality of units or slices of a last level cache (LLC) 1240A-1240N; these LLCs often include storage and cache controller functionality and are shared amongst the cores, as well as potentially among the graphics engine too.

As seen, a ring interconnect 1250 couples the cores together, and provides interconnection between the core domain 1230, graphics domain 1260 and system agent circuitry 1210, via a plurality of ring stops 1252A-1252N, each at a coupling between a core and LLC slice. As seen in FIG. 12, interconnect 1250 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1210 includes display engine 1212 which is to provide control of and an interface to an associated display. System agent domain 1210 may include other units, such as: an integrated memory controller 1220 that provides for an interface to a system memory (e.g., a DRAM implemented with multiple DIMMs; coherence logic 1222 to perform memory coherence operations. Multiple interfaces may be present to enable interconnection between the processor and other circuitry. For example, in one embodiment at least one direct media interface (DMI) 1216 interface is provided as well as one or more PCIe™ interfaces 1214. The display engine and these interfaces typically couple to memory via a PCIe™ bridge 1218. Still further, to provide for communications between other agents, such as additional processors or other circuitry, one or more other interfaces may be provided.

Figure 13:
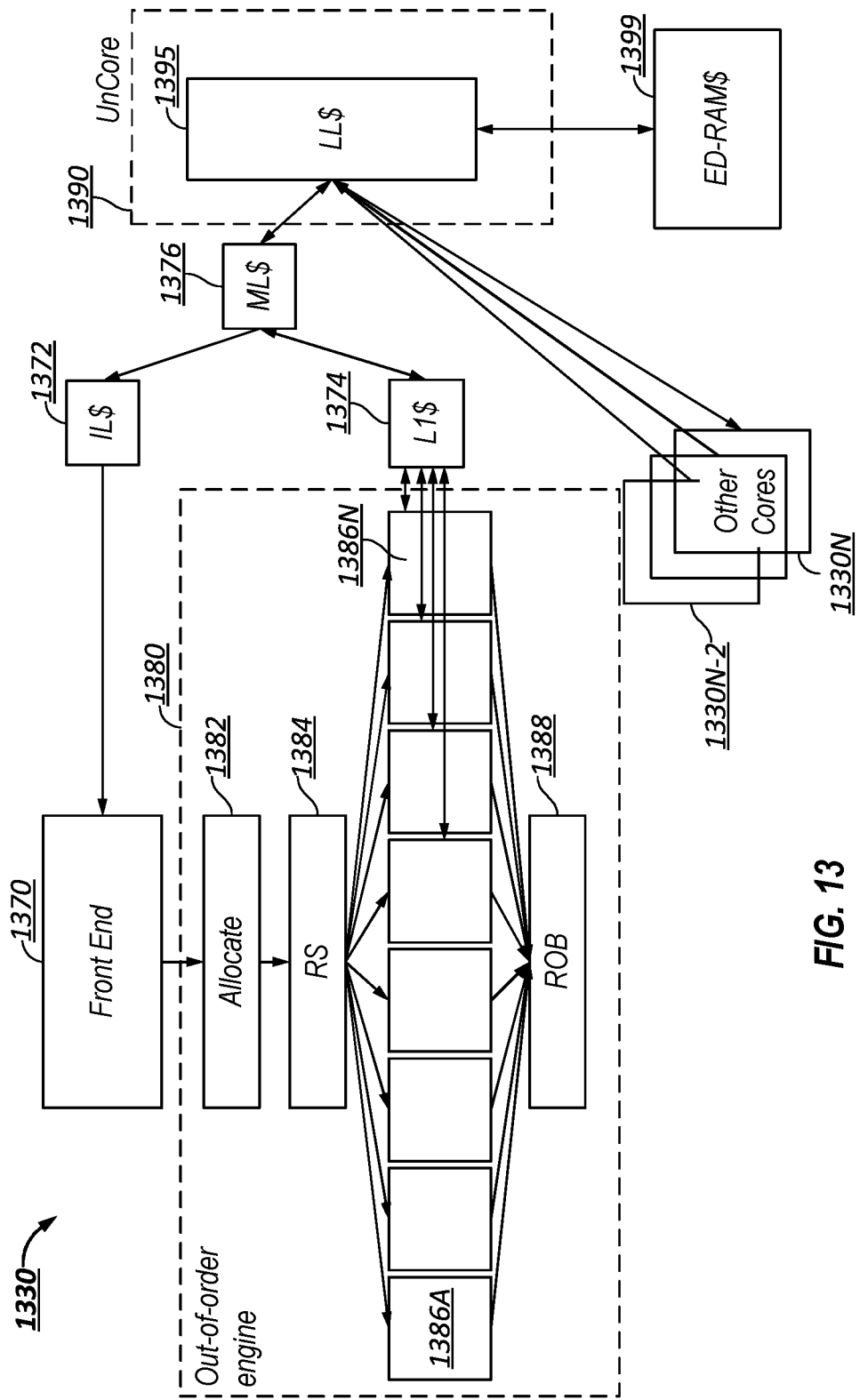
FIG. 13 illustrates an embodiment of a block diagram for a processor.

Referring now to FIG. 13, shown is a block diagram of a representative core; specifically, logical blocks of a back-end of a core, such as core 1230 from FIG. 12. In general, the structure shown in FIG. 13 includes an out-of-order processor that has a front end unit 1370 used to fetch incoming instructions, perform various processing (e.g. caching, decoding, branch predicting, etc.) and passing instructions/operations along to an out-of-order (OOO) engine 1380. OOO engine 1380 performs further processing on decoded instructions.

Specifically in the embodiment of FIG. 13, out-of-order engine 1380 includes an allocate unit 1382 to receive decoded instructions, which may be in the form of one or more micro-instructions or uops, from front end unit 1370, and allocate them to appropriate resources such as registers and so forth. Next, the instructions are provided to a reservation station 1384, which reserves resources and schedules them for execution on one of a plurality of execution units 1386A-1386N. Various types of execution units may be present, including, for example, arithmetic logic units (ALUs), load and store units, vector processing units (VPUs), floating point execution units, among others. Results from these different execution units are provided to a reorder buffer (ROB) 1388, which take unordered results and return them to correct program order.

Still referring to FIG. 13, note that both front end unit 1370 and out-of-order engine 1380 are coupled to different levels of a memory hierarchy. Specifically shown is an instruction level cache 1372, that in turn couples to a mid-level cache 1376, that in turn couples to a last level cache 1395. In one embodiment, last level cache 1395 is implemented in an on-chip (sometimes referred to as uncore) unit 1390. As an example, unit 1390 is similar to system agent 1210 of FIG. 12. As discussed above, uncore 1390 communicates with system memory 1399, which, in the illustrated embodiment, is implemented via ED RAM. Note also that the various execution units 1386 within out-of-order engine 1380 are in communication with a first level cache 1374 that also is in communication with mid-level cache 1376. Note also that additional cores 1330N-2-1330N can couple to LLC 1395. Although shown at this high level in the embodiment of FIG. 13, understand that various alterations and additional components may be present.

Figure 14:
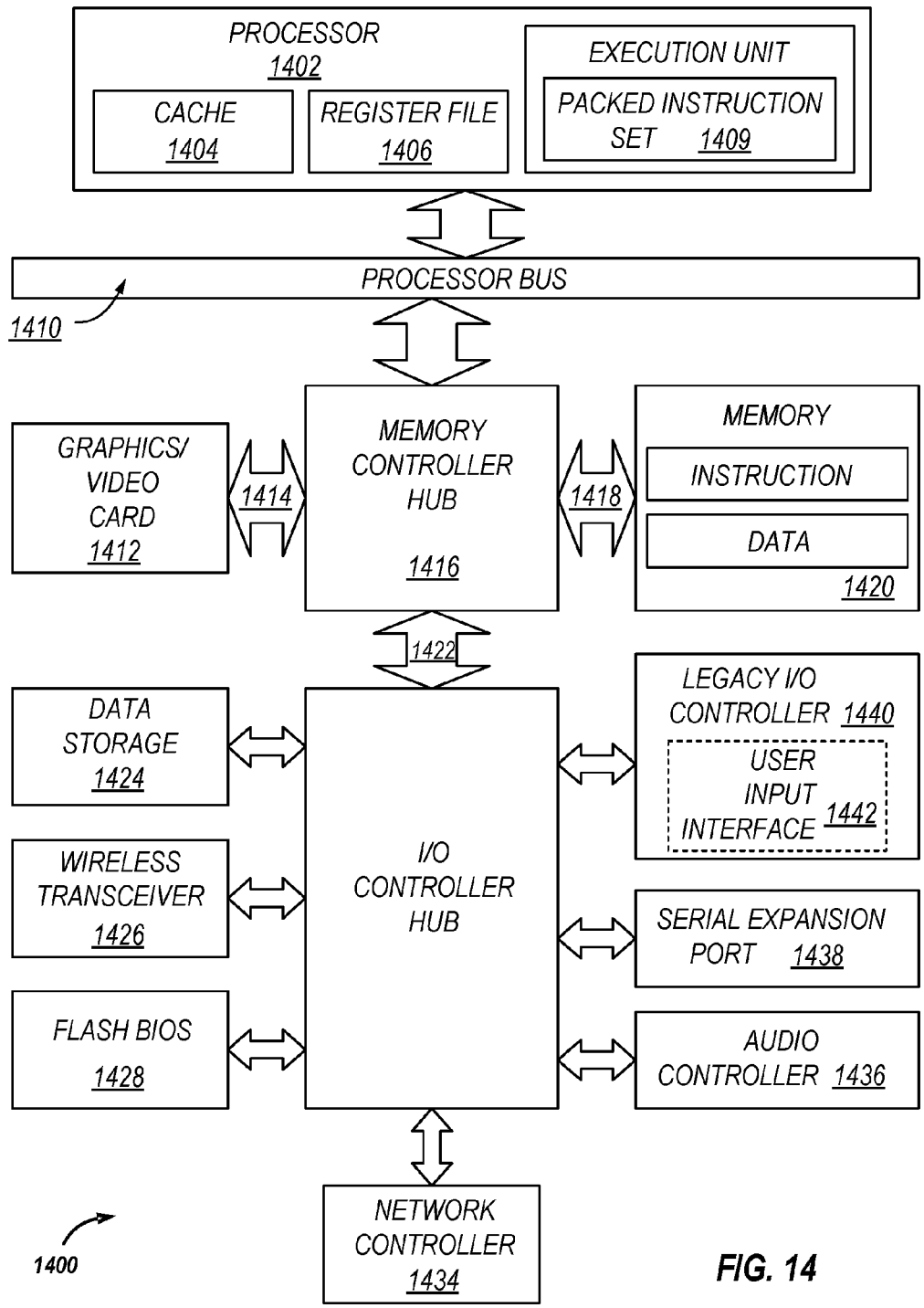
FIG. 14 illustrates another embodiment of a block diagram for a computing system including a processor.

Turning to FIG. 14, a block diagram of an exemplary computer system formed with a processor that includes execution units to execute an instruction, where one or more of the interconnects implement one or more features in accordance with one embodiment of the present invention is illustrated. System 1400 includes a component, such as a processor 1402 to employ execution units including logic to perform algorithms for process data, in accordance with the present invention, such as in the embodiment described herein. System 1400 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 1400 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1402 includes one or more execution units 1408 to implement an algorithm that is to perform at least one instruction. One embodiment may be described in the context of a single processor desktop or server system, but alternative embodiments may be included in a multiprocessor system. System 1400 is an example of a 'hub' system architecture. The computer system 1400 includes a processor 1402 to process data signals. The processor 1402, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1402 is coupled to a processor bus 1410 that transmits data signals between the processor 1402 and other components in the system 1400. The elements of system 1400 (e.g. graphics accelerator 1412, memory controller hub 1416, memory 1420, I/O controller hub 1424, wireless transceiver 1426, Flash BIOS 1428, Network controller 1434, Audio controller 1436, Serial expansion port 1438, I/O controller 1440, etc.) perform their conventional functions that are well known to those familiar with the art.

In one embodiment, the processor 1402 includes a Level 1 (L1) internal cache memory 1404. Depending on the architecture, the processor 1402 may have a single internal cache or multiple levels of internal caches. Other embodiments include a combination of both internal and external caches depending on the particular implementation and needs. Register file 1406 is to store different types of data in various registers including integer registers, floating point registers, vector registers, banked registers, shadow registers, checkpoint registers, status registers, and instruction pointer register.

Execution unit 1408, including logic to perform integer and floating point operations, also resides in the processor 1402. The processor 1402, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1402. For one embodiment, execution unit 1408 includes logic to handle a packed instruction set 1409. By including the packed instruction set 1409 in the instruction set of a general-purpose processor 1402, along with associated circuitry to execute the instructions, the operations used by many multimedia applications may be performed using packed data in a general-purpose processor 1402. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1408 may also be used in micro controllers, embedded processors, graphics devices, DSPs, and other types of logic circuits. System 1400 includes a memory 1420. Memory 1420 includes a dynamic random access memory (DRAM) device, a static random access memory (SRAM) device, flash memory device, or other memory device. Memory 1420 stores instructions and/or data represented by data signals that are to be executed by the processor 1402.

Note that any of the aforementioned features or aspects of the invention may be utilized on one or more interconnect illustrated in FIG. 14. For example, an on-die interconnect (ODI), which is not shown, for coupling internal units of processor 1402 implements one or more aspects of the invention described above. Or the invention is associated with a processor bus 1410 (e.g. other known high performance computing interconnect), a high bandwidth memory path 1418 to memory 1420, a point-to-point link to graphics accelerator 1412 (e.g. a Peripheral Component Interconnect express (PCIe) compliant fabric), a controller hub interconnect 1422, an I/O or other interconnect (e.g. USB, PCI, PCIe) for coupling the other illustrated components. Some examples of such components include the audio controller 1436, firmware hub (flash BIOS) 1428, wireless transceiver 1426, data storage 1424, legacy I/O controller 1410 containing user input and keyboard interfaces 1442, a serial expansion port 1438 such as Universal Serial Bus (USB), and a network controller 1434. The data storage device 1424 can comprise a hard disk drive, a floppy disk drive, a CD-ROM device, a flash memory device, or other mass storage device.

Figure 15:
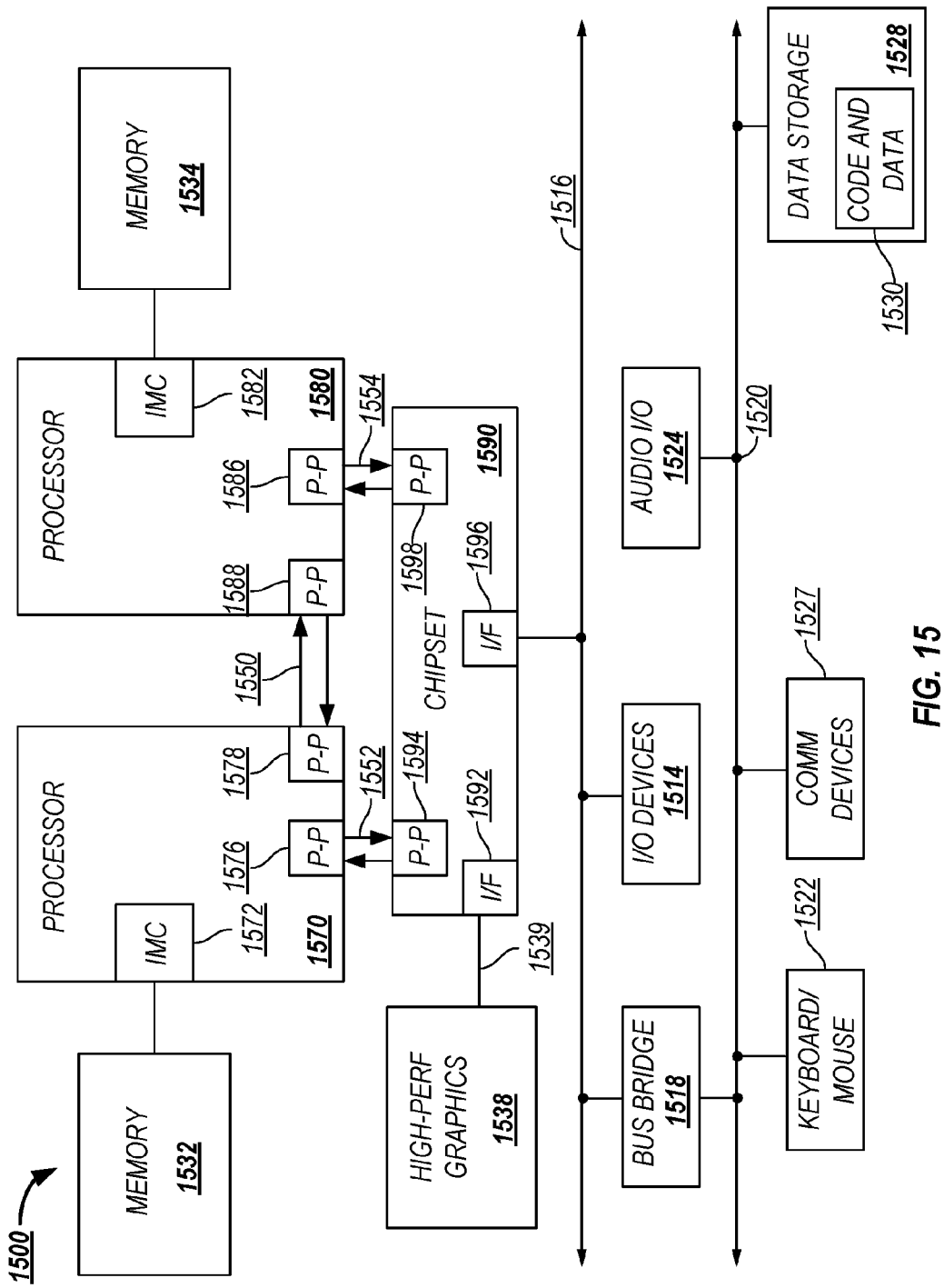
FIG. 15 illustrates an embodiment of a block for a computing system including multiple processor sockets.

Referring now to FIG. 15, shown is a block diagram of a second system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of a processor. In one embodiment, 1552 and 1554 are part of a serial, point-to-point coherent interconnect fabric, such as a high-performance architecture. As a result, the invention may be implemented within the QPI architecture.

While shown with only two processors 1570, 1580, it is to be understood that the scope of the present invention is not so limited. In other embodiments, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 each exchange information with a chipset 1590 via individual P-P interfaces 1552, 1554 using point to point interface circuits 1576, 1594, 1586, 1598. Chipset 1590 also exchanges information with a high-performance graphics circuit 1538 via an interface circuit 1592 along a high-performance graphics interconnect 1539.

A shared cache (not shown) may be included in either processor or outside of both processors; yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 are coupled to first bus 1516, along with a bus bridge 1518 which couples first bus 1516 to a second bus 1520. In one embodiment, second bus 1520 includes a low pin count (LPC) bus. Various devices are coupled to second bus 1520 including, for example, a keyboard and/or mouse 1522, communication devices 1527 and a storage unit 1528 such as a disk drive or other mass storage device which often includes instructions/code and data 1530, in one embodiment. Further, an audio I/O 1524 is shown coupled to second bus 1520. Note that other architectures are possible, where the included components and interconnect architectures vary. For example, instead of the point-to-point architecture of FIG. 15, a system may implement a multi-drop bus or other such architecture.

Figure 16:
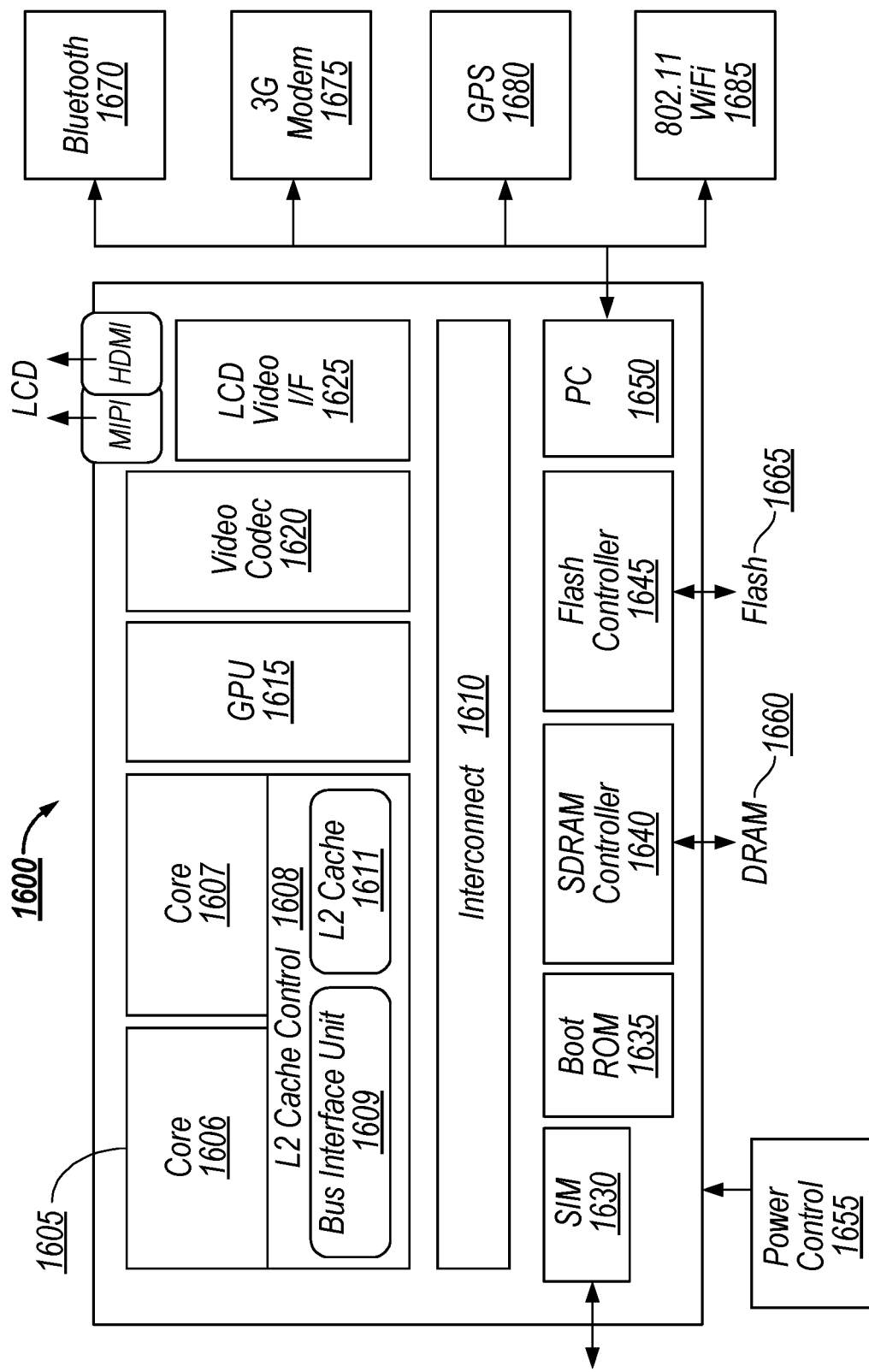
FIG. 16 illustrates another embodiment of a block diagram for a computing system.

Turning next to FIG. 16, an embodiment of a system on-chip (SOC) design in accordance with the inventions is depicted. As a specific illustrative example, SOC 1600 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1600 includes 2 cores—1606 and 1607. Similar to the discussion above, cores 1606 and 1607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1606 and 1607 are coupled to cache control 1608 that is associated with bus interface unit 1609 and L2 cache 1611 to communicate with other parts of system 1600. Interconnect 1610 includes an on-chip interconnect, such as an IOSF, AMBA, or other interconnect discussed above, which potentially implements one or more aspects of described herein.

Interconnect 1610 provides communication channels to the other components, such as a Subscriber Identity Module (SIM) 1630 to interface with a SIM card, a boot rom 1635 to hold boot code for execution by cores 1606 and 1607 to initialize and boot SOC 1600, a SDRAM controller 1640 to interface with external memory (e.g. DRAM 1660), a flash controller 1645 to interface with non-volatile memory (e.g. Flash 1665), a peripheral control 1650 (e.g. Serial Peripheral Interface) to interface with peripherals, video codecs 1620 and Video interface 1625 to display and receive input (e.g. touch enabled input), GPU 1615 to perform graphics related computations, etc. Any of these interfaces may incorporate aspects of the invention described herein.

In addition, the system illustrates peripherals for communication, such as a Bluetooth module 1670, 3G modem 1675, GPS 1685, and WiFi 1685. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    a receiver processor comprising an agent to support a layered protocol stack comprising physical layer logic, link layer logic, and protocol layer logic, wherein the agent is to:
        receive a link layer data stream within an active link state (L0), wherein the link layer data comprises a set of flits;
        intermittently enter a coordination link state (L0c), wherein the coordination link state defines a L0c interval in which physical layer control;
        receive a control code within the L0c interval; and
        initiate a reset of the link based on a control code mismatch, wherein the control code mismatch is based on an identification that the control code fails to match one of a set of specified codes.

2. The apparatus of claim 1, wherein the control code mismatch is based on a bit error.

3. The apparatus of claim 1, wherein the physical layer logic is further to attempt to resolve the bit error and the control code mismatch is identified in response to a failure to resolve the bit error.

4. The apparatus of claim 1, wherein the control code is to be from a set comprising a reset request code, a low power entry request, a partial width entry request, and a partial width exit request.

5. The apparatus of claim 1, wherein the L0c interval is to be entered according to a defined interval.

6. The apparatus of claim 5, wherein the L0c interval is to be entered periodically according to the defined interval.

7. The apparatus of claim 1, wherein the L0c interval is a defined length.

8. The apparatus of claim 1, wherein the L0c interval is to begin and end on clean flit boundaries.

9. The apparatus of claim 1, wherein the control code comprises an 8-bit code.

10. The apparatus of claim 1, wherein the control code comprises a request control sequence.

11. The apparatus of claim 1, wherein the agent is further to detect that the control code fails to match one of a set of specified codes.

12. The apparatus of claim 11, wherein the agent comprises comparison circuitry to detect that the control code fails to match one of the set of specified codes.

13. The apparatus of claim 1, further comprising transmitter logic to send data to indicate entry into L0c, and send one or more control codes within L0c intervals.

14. The apparatus of claim 1, wherein the reset comprises an in-band reset.

15. A method comprising:
receiving a link layer data stream within an active link state (L0), wherein the link layer data comprises a set of flits;
intermittently entering a coordination link state (L0c), wherein the coordination link state defines a L0c interval in which physical layer control;
receiving a control code within the L0c interval; and
initiating a reset of the link based on a control code mismatch, wherein the control code mismatch is based on an identification that the control code fails to match one of a set of specified codes.

16. The method of claim 15, further comprising sending one or more control codes within the L0c interval.

17. The method of claim 15, further comprising detecting that the control code fails to match one of the set of specified codes.

18. A system comprising:
a first computing device; and
a second computing device coupled to the first computing device by a link, wherein the second processor device comprises:
link layer circuitry to receive a link layer data stream within an active link state (L0), wherein the link layer data comprises a set of flits;
state machine logic to intermittently enter a coordination link state (L0c), wherein the coordination link state defines a L0c interval in which physical layer control;
physical layer circuitry to:
identify a control code received from the first computing device within the L0c interval; and
initiate a reset of the link based on a control code mismatch, wherein the control code mismatch is based on an identification that the control code fails to match one of a set of specified codes.

19. The system of claim 18, wherein the first computing device comprises a first processor and the second computing device comprises a second processor.

* * * * *